US009503970B2

(12) United States Patent
Horn et al.

(10) Patent No.: US 9,503,970 B2
(45) Date of Patent: Nov. 22, 2016

(54) MANAGING A DATA NETWORK CONNECTION FOR MOBILE COMMUNICATIONS BASED ON USER LOCATION

(75) Inventors: Gavin Bernard Horn, La Jolla, CA (US);
(Continued)

(73) Assignee: QUALCOMM Incorporated, San Diego, CA (US)

( * ) Notice: Subject to any disclaimer, the term of this patent is extended or adjusted under 35 U.S.C. 154(b) by 595 days.

(21) Appl. No.: 12/893,190

(22) Filed: Sep. 29, 2010

(65) Prior Publication Data
US 2011/0235546 A1 Sep. 29, 2011

Related U.S. Application Data

(60) Provisional application No. 61/266,897, filed on Dec. 4, 2009.

(51) Int. Cl.
*H04W 48/00* (2009.01)
*H04L 12/66* (2006.01)
(Continued)

(52) U.S. Cl.
CPC .............. *H04W 48/17* (2013.01); *H04L 12/66* (2013.01); *H04W 76/02* (2013.01); *H04W 80/04* (2013.01); *H04W 88/16* (2013.01)

(58) Field of Classification Search
None
See application file for complete search history.

(56) References Cited

U.S. PATENT DOCUMENTS 6,243,363 B1 * 6/2001 Quinquis et al. ............. 370/277
8,111,630 B2 * 2/2012 Kovvali et al. ............... 370/252
(Continued)

FOREIGN PATENT DOCUMENTS

CN 1491063 A 4/2004
CN 1732660 A 2/2006
(Continued)

OTHER PUBLICATIONS

Ericsson et al., "GW selection for SIPTO and LIPA", 3rd Generation Partnership Project (3GPP) Draft S2-097246, Nov. 21, 2009 (Nov. 21, 2009), XP050432437, [retrieved on Nov. 21, 2009].
(Continued)

*Primary Examiner* — Wei Zhao
*Assistant Examiner* — Ronald H Davis
(74) *Attorney, Agent, or Firm* — François A. Pelaez

(57) ABSTRACT

Providing for select Internet Protocol traffic offload (SIPTO) in a mobile communication environment is described herein. By way of example, SIPTO traffic can be facilitated via local packet gateways (P-GWs) that provide an interface to the Internet or a like data network, in addition to a centralized gateway GPRS support node (GGSN). Eligibility for SIPTO can be on a user equipment (UE) by UE basis; for instance, relying on stored subscription or account information to determine SIPTO eligibility. In particular aspects, eligibility for SIPTO can also be based on a packet network by packet network basis, or a combination of the foregoing. This enables flexibility in determining whether SIPTO can be established for a given UE in a given location, and can be based for instance on UE capability, subscription status information, data network capability, tariff rates, and so on, as well as different legal requirements of government jurisdictions.

38 Claims, 17 Drawing Sheets

(75) Inventors: Gerardo Giaretta, San Diego, CA (US); Miguel Griot, San Diego, CA (US); Osok Song, San Diego, CA (US)

(51) Int. Cl.
*H04W 76/02* (2009.01)
*H04W 80/04* (2009.01)
*H04W 88/16* (2009.01)

(56) References Cited

U.S. PATENT DOCUMENTS

| | | | |
|---|---|---|---|
| 8,774,049 B2 | 7/2014 | Rune et al. | |
| 2003/0217262 A1 | 11/2003 | Kawai et al. | |
| 2005/0148368 A1* | 7/2005 | Scheinert et al. | 455/561 |
| 2005/0245250 A1* | 11/2005 | Ebenshpanger | 455/421 |
| 2006/0146781 A1 | 7/2006 | Adrangi et al. | |
| 2007/0036151 A1* | 2/2007 | Baeder | 370/352 |
| 2007/0091846 A1* | 4/2007 | Kim et al. | 370/331 |
| 2007/0268873 A1* | 11/2007 | Borella et al. | 370/338 |
| 2008/0043676 A1* | 2/2008 | Mousseau et al. | 370/331 |
| 2008/0145050 A1* | 6/2008 | Mayer et al. | 398/49 |
| 2008/0242298 A1* | 10/2008 | Nylander et al. | 455/435.2 |
| 2008/0285492 A1* | 11/2008 | Vesterinen | 370/310 |
| 2009/0086672 A1 | 4/2009 | Gholmieh et al. | |
| 2009/0124254 A1* | 5/2009 | Witzel et al. | 455/435.1 |
| 2009/0129377 A1* | 5/2009 | Chamberlain et al. | 370/389 |
| 2009/0175241 A1* | 7/2009 | Ohta et al. | 370/331 |
| 2009/0180437 A1 | 7/2009 | Kanazawa | |
| 2010/0036953 A1* | 2/2010 | Bogovic et al. | 709/226 |
| 2010/0054222 A1* | 3/2010 | Rune | H04L 29/12066 370/338 |
| 2010/0128696 A1* | 5/2010 | Fantini et al. | 370/331 |
| 2010/0195621 A1* | 8/2010 | Kekki et al. | 370/332 |
| 2010/0208658 A1* | 8/2010 | Vesterinen | H04W 8/082 370/328 |
| 2010/0227614 A1* | 9/2010 | Chun et al. | 455/436 |
| 2010/0291943 A1* | 11/2010 | Mihaly et al. | 455/450 |
| 2011/0013587 A1* | 1/2011 | Serravalle | 370/331 |
| 2011/0116469 A1* | 5/2011 | Bi et al. | 370/331 |
| 2011/0292896 A1* | 12/2011 | Yeuom et al. | 370/329 |
| 2012/0102174 A1* | 4/2012 | Zhou et al. | 709/223 |
| 2012/0224536 A1* | 9/2012 | Hahn et al. | 370/328 |
| 2012/0269162 A1 | 10/2012 | Vesterinen et al. | |

FOREIGN PATENT DOCUMENTS

| | | |
|---|---|---|
| JP | 2003318992 A | 11/2003 |
| JP | 2007336113 A | 12/2007 |
| JP | 2009502090 A | 1/2009 |
| JP | 2009182994 A | 8/2009 |
| JP | 2011509026 A | 3/2011 |
| RU | 2366105 C2 | 8/2009 |
| RU | 2367117 C2 | 9/2009 |
| WO | 2004012433 A1 | 2/2004 |
| WO | 2005048616 A1 | 5/2005 |
| WO | 2005051026 A1 | 6/2005 |
| WO | 2007011190 A1 | 1/2007 |
| WO | 2007125592 A1 | 11/2007 |
| WO | 2008060208 A1 | 5/2008 |
| WO | WO2008125729 A1 | 10/2008 |
| WO | 2009085608 A1 | 7/2009 |
| WO | 2009119699 A2 | 10/2009 |

OTHER PUBLICATIONS

International Search Report and Written Opinion—PCT/US2010/058978, ISA/EPO—Jul. 13, 2011.
Qualcomm Europe: "LIPA solution for H(e)NB using a local PDN connection", 3rd Generation Partnership Project (3GPP) Draft S2-095089, Aug. 28, 2009 (Aug. 28, 2009), XP050396619, [retrieved on Aug. 25, 2009].
Starent Networks: "Selected IP Traffic Offload for UMTS at IuPS", 3rd Generation Partnership Project (3GPP) Draft S2-097216, Nov. 16, 2009 (Nov. 16, 2009), XP050398003, [retrieved on Nov. 17, 2009].
ZTE: "Discussion on LIPA_SIPTO Solution", 3rd Generation Partnership Project (3GPP) Draft S2-096637, Nov. 16, 2009 (Nov. 16, 2009), XP050397577, [retrieved on Nov. 10, 2009].
Motorola: "Architectural Principles for UE to Support Local IP Access and Selected IP Traffic Offload," 3GPP TSG SA WG2 Meeting #75 TD S2-095219, Aug. 31, 2009.
NEC: "Details for LIPA and SIPTO—Extension Tunnel based architecture,"3GPP TSG SA WG2 Meeting #76 TD S2-097476, Nov. 16, 2009.
Vodafone, Verizon Wireless, BT, Huawei Technologies, "Selected IP Traffic Offload", 3GPP TSG-SA WG1 Meeting #47, S1-093341, Aug. 3, 2009.
3GPP 23.861 V1.3.0: 3rd Generation Partnership Project, Technical Specification Group Services and System Aspects; Local IP Access and Selected IP Traffic Offload, Sep. 14, 2010, pp. 1-44.
Qualcomm Europe: "Key aspects: P-GW/GGSN location principles for LIPA and SIPTO traffic" 3GPP Draft; S2-095088, 3rd Generation Partnership Project (3GPP), Mobile Competence Centre : 650, Route Des Lucioles ; F-06921 Sophia-Antipolis Cedex ; France, No. Kyoto; 20090904, Aug. 28, 2009 (Aug. 28, 2009), XP050396618, [retrieved on Aug. 25, 2009].
European Search Report—EP13188323—Search Authority—The Hague—Nov. 19, 2013.
Taiwan Search Report—TW099142435—TIPO—Sep. 10, 2013.
Samsung: Fix LIPA open issues [online], 3GPP TSG-SA WG2# 79, S2-102386, May 10, 2010, 8 Pages, Retrieved from the Internet: URL: URL:http://www.3gpp.org/ftp/tsg_sa/WG2_Arch/TSGS2_79_Kyoto/Docs/S2-102386.zip.

\* cited by examiner

MANAGING A DATA NETWORK CONNECTION FOR MOBILE COMMUNICATIONS BASED ON USER LOCATION

CLAIM OF PRIORITY UNDER 35 U.S.C §119

The present application for patent claims priority to Provisional Patent Application Ser. No. 61/266,897 entitled "MANAGING A PDN CONNECTION BASED ON USER LOCATION" and filed Dec. 4, 2009, assigned to the assignee hereof and hereby expressly incorporated by reference herein.

BACKGROUND

I. Field

The following description relates generally to wireless communications, and more particularly to facilitating wireless communication for terminals observing significant wireless interference.

II. Background

Wireless communication systems are widely deployed to provide various types of communication content, such as voice content, data content, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

To supplement conventional mobile phone network base stations, additional base stations may be deployed to provide more robust wireless coverage to mobile units. For example, wireless relay stations and small-coverage base stations (e.g., commonly referred to as access point base stations, Home NodeBs, Femto access points, or Femto cells) may be deployed for incremental capacity growth, richer user experience, and in-building coverage. Typically, such small-coverage base stations are connected to the Internet and the mobile operator's network via DSL router or cable modem. As these other types of base stations may be added to the conventional mobile phone network (e.g., the backhaul) in a different manner than conventional base stations (e.g., macro base stations), there is a need for effective techniques for managing these other types of base stations and their associated user equipment.

One aspect of mobile communications is integrated mobile data services. Recently, many mobile devices and mobile communication service providers have transitioned to incorporate Internet Protocol or like data network capabilities. From a user equipment (UE) perspective, user applications as well as some communication protocols facilitating communicating with a data network have been integrated into hardware/software/firmware of the UE. From a network perspective, service provider networks and core networks have been updated with infrastructure for establishing packet network connections for UEs. By serving as an intermediary between a radio access network communicatively coupled with these UEs, and the packet connection at the data network (e.g., the Internet), a core network can deliver Internet services to respective UEs (as well as intranet services, or other wide area network data services). As more users retain subscriptions for data network-based mobile services, these services become more valuable and the focus of future infrastructure improvement on the part of mobile service providers.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the subject disclosure in a simplified form as a prelude to the more detailed description that is presented later.

Various aspects of the subject disclosure provide for selected Internet Protocol traffic offload (SIPTO) for establishing data services in a mobile communication environment. In some aspects, SIPTO traffic can be facilitated via a network of local packet gateways (local P-GWs, also referred to herein as local gateways or L-GWs) that provide an interface to the Internet or a like data network. Instead of the few centralized gateway GPRS support nodes (GGSN) or packet gateways (P-GW), local packet gateways (L-GW) can provide similar functionality as a GGSN or a centralized P-GW, but can be deployed throughout a radio access network, providing a local alternative to the centralized GGSN or P-GW for packet network access. Further, eligibility for SIPTO can be on a user equipment (UE) by UE basis; for instance, relying on data within a UE's stored subscriber or account information to determine SIPTO eligibility. In particular aspects, eligibility for SIPTO can also be based on a packet network by packet network basis, or a combination thereof. This enables flexibility in determining whether SIPTO can be established for a given UE in a given location, and can be based for instance on UE capability, subscription status information, data network capability, tariff rates, and so on, as well as different legal requirements of a government jurisdiction.

In other aspects of the subject disclosure are provided mechanisms for maintenance of a packet network connection at a local GW. Existing packet connections supported by the local GW can be analyzed and an identifier for the local GW compared with an identifier of a current packet network or mobile network access point serving a UE. If the identifier does not match a second identifier of a current serving packet network gateway, the packet network connection can be terminated. Optionally, a reactivation command can be forwarded to the UE in the event that the UE has not terminated packet services. Likewise, the UE can request reactivation in other disclosed aspects, based on receipt of a reactivation command, completing a handover, or comparison of current and previous packet network gateway identifiers, or the like. Accordingly, network resources expended to provide various packet connections can be preserved in an efficient manner, while mitigating session drops or data loss.

In other aspects of the subject disclosure, provided is a method for wireless communication. The method can comprise receiving a request to establish a data network connection for a UE coupled with a mobile network. Furthermore, the method can comprise determining whether a local Internet Protocol (IP) traffic service is permitted for the UE based on a set of stored subscription information pertaining to the UE. In addition to the foregoing, the method can comprise identifying a local data network gateway associated with a cell or an access point of the mobile network serving the UE for establishing the data network connection if the local IP traffic service is permitted.

In other aspects, provided is an apparatus for wireless communication. The apparatus can comprise memory for storing instructions that facilitate offloading Internet Protocol (IP) traffic to local packet network gateways and a data processor that executes modules to implement the instructions. Particularly, the modules can comprise a receiving module that identifies a request for a connection to an IP network and that retrieves a set of subscription information for a UE initiating the request. Additionally, the modules can also comprise a parsing module that analyzes the subscription information and determines whether the UE is permitted to utilize local GW service. Furthermore, the modules can additionally comprise a reference module that identifies a local GW to establish the connection to the IP network, and that is associated with a base station providing mobile network service to the UE.

In yet another aspect is disclosed an apparatus for wireless communication. The apparatus can comprise means for receiving a request to establish a data network connection for a UE coupled with a mobile network. Moreover, the apparatus can comprise means for determining whether a local Internet Protocol (IP) traffic service is permitted for the UE based on a set of stored subscription information pertaining to the UE. Additionally, the apparatus can comprise means for identifying a local data network gateway to establish the data network connection associated with a cell or an access point of the mobile network serving the UE, if the local IP traffic service is permitted.

According to one or more additional aspects, disclosed is at least one processor configured for wireless communication. The processor(s) can comprise a first module that receives a request to establish a data network connection for a UE coupled with a mobile network. In addition, the processor(s) can comprise a second module that determines whether a local Internet Protocol (IP) traffic service is permitted for the UE based on a set of stored subscription information pertaining to the UE. Moreover, the processor(s) can comprise a third module that identifies a local data network gateway to establish the data network connection that is associated with a cell or an access point of the mobile network serving the UE, if the local IP traffic service is permitted.

According to at least one aspect, the subject disclosure provides a computer program product comprising a computer-readable medium. The computer-readable medium can comprise a first set of code for causing a computer to receive a request to establish a data network connection for a UE coupled with a mobile network. Additionally, the computer-readable medium can comprise a second set of code for causing the computer to determine whether a local Internet Protocol (IP) traffic service is permitted for the UE based on a set of stored subscription information pertaining to the UE. Further, the computer-readable medium can comprise a third set of code for causing the computer to identify a local data network gateway to establish the data network connection that is associated with a cell or an access point of the mobile network serving the UE, if the local IP traffic service is permitted.

Further to the above, particular aspects of the subject disclosure provide a method of wireless communication. The method can comprise identifying a data network connection established for a UE that receives wireless service from a mobile network base station. Moreover, the method can comprise referencing a first identifier associated with a data network access point that facilitates the data network connection. Additionally, the method can comprise initiating deactivation of the data network connection if the first identifier does not match a second identifier of a data network access point associated with the mobile network base station.

In other aspects, disclosed is an apparatus configured for wireless communication. The apparatus can comprise memory comprising instructions configured for management and removal of active data network connections associated with a radio access network (a RAN) and a data processor that executes module for implementing the instructions. Specifically, the modules can comprise a maintenance module that identifies an established connection at a local GW that serves the RAN. The modules can further comprise a termination module that initiates a deactivation of the connection if a UE identified with the connection is actively coupled with a wireless node of the RAN that is outside of a service area of the local GW.

According to yet another aspect, disclosed is an apparatus for wireless communication. The apparatus can comprise means for identifying a packet connection at a local GW that provides data network service to a RAN. Furthermore, the apparatus can comprise means for terminating the connection if a user equipment (UE) identified with the connection is actively coupled with a wireless node of the RAN that is outside of a service area of the local GW, wherein the service area is defined by at least one of: a data set that correlates wireless nodes of the RAN to the local GW or the set of wireless nodes for which a domain name server query comprising an identifier of the UE or an identifier of the wireless node returns the local GW.

In one or more additional aspects, provided is at least one processor configured for wireless communication. The processor(s) can comprise a first module that identifies a packet connection at a local GW that provides data network service to a RAN. Additionally, the processor(s) can comprise a second module that terminates the connection if a user equipment (UE) identified with the connection is actively coupled with a wireless node of the RAN that is outside of a service area of the local GW, wherein the service area is defined by at least one of: a data set that correlates wireless nodes of the RAN to the local GW or the set of wireless nodes for which a domain name server query comprising an identifier of the UE or an identifier of the wireless node returns the local GW.

In at least one other aspect the subject disclosure provides a computer program product comprising a computer-readable medium. The computer-readable medium can comprise a first set of code for causing a computer to identify a packet connection at a local GW that provides data network service to a RAN. Moreover, the computer-readable medium can comprise a second set of code for causing the computer to terminate the connection if a user equipment (UE) identified with the connection is actively coupled with a wireless node of the RAN that is outside of a service area of the local GW, wherein the service area is defined by at least one of: a data set that correlates wireless nodes of the RAN to the local GW or the set of wireless nodes for which a domain name server query comprising an identifier of the UE or of the wireless node returns the local GW.

In addition to the foregoing, the subject disclosure also provides a method of wireless communication. The method can comprise establishing a data network connection via a wireless network and receiving a request to deactivate the data network connection. Furthermore, the method can comprise initiating a request to reactivate the data network connection if a cell identifier of a current serving cell is different from a most recent cell identifier associated with the data network connection.

According to one or more particular aspects, provided is an apparatus for wireless communication. The apparatus can comprise memory for storing instructions configured to maintain packet network connections in a mobile access environment and a data processor that executes modules to implement the instructions. Particularly, these modules can comprise a connection module that receives a command to deactivate a data network connection that is established at a SIPTO gateway, and a continuation module that initiates a request to reactivate the data network connection if a cell identifier of a current serving cell is different from a most recent cell identifier associated with the data network connection.

In another aspect, provided is an apparatus for wireless communication. The apparatus can comprise means for establishing a data network connection via a wireless network and means for receiving a request to deactivate the data network connection. Additionally, the apparatus can comprise means for initiating a request to reactivate the data network connection if a cell identifier of a current serving cell is different from a most recent cell identifier associated with the data network connection.

According to still other disclosed aspects, provided is at least one processor configured for wireless communication. The processor(s) can comprise a first module that establishes a data network connection via a wireless network and a second module that receives a request to deactivate the data network connection. In addition, the processor(s) can comprise a third module that initiates a request to reactivate the data network connection if a cell identifier of a current serving cell is different from a most recent cell identifier associated with the data network connection.

In at least one additional aspect the subject disclosure provides a computer program product comprising a computer-readable medium. The computer-readable medium can comprise a first set of code that causes a computer to establish a data network connection via a wireless network and a second set of code that causes the computer to decode a request to deactivate the data network connection received from an entity of the wireless network. Moreover, the computer-readable medium can comprise a third set of code that causes the computer to initiate a request to reactivate the data network connection if a cell identifier of a current serving cell is different from a most recent cell identifier associated with the data network connection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
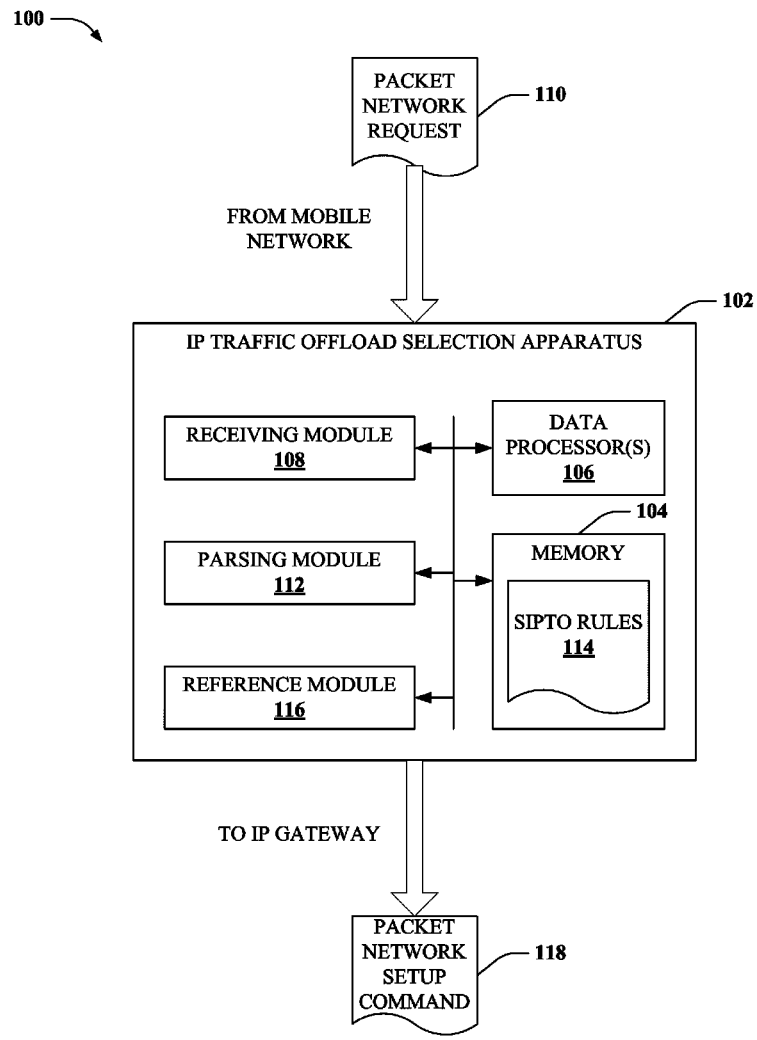
FIG. 1 illustrates a block diagram of an example apparatus that provides select Internet Protocol traffic offload (SIPTO) in some disclosed aspects.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of arbitrating between central and local packet gateway connections for data service in mobile communications, among other things. One skilled in the art should appreciate that similar techniques could apply to other communication environments.

As wireless network infrastructure and resources improve over time, and as processing and user interface capabilities of mobile devices become more sophisticated, users are able to employ mobile devices to perform functions formerly available only with personal computers and fixed line communications. The ability to employ a small, portable device for high quality voice communication, Internet access, multimedia access and playback, as well as entertainment, results in a highly desirable consumer product. Data to be consumed by these mobile devices (e.g., a user equipment [UE] in a mobile communication apparatus) is delivered over-the-air via a radio access network (RAN). These RANs can comprise provider-deployed infrastructure, such as a macro cellular network deployment, subscriber-deployed infrastructure, including local area network wireless routers, or a combination thereof, such as a conventional macro deployment with subscriber-deployed base stations, referred to as home node B (HNB), enhanced HNB (HeNB), Femto cells, or the like.

Wireless communication networks can provide voice services, data services, or both. For voice services, traditional cellular core network infrastructure facilitates analog voice communication between remote subscribers. Also, voice over Internet Protocol (VoIP) leverages digital capabilities of packet data networks to provide digital voice communication. VoIP can be instituted within a cellular network by coupling the cellular network to a digital IP network through a packet gateway (P-GW) that contains protocols for propagating data between the respective networks. An example of a conventional P-GW is a gateway GPRS (general packet radio service) support node, or GGSN.

The GGSN is a relatively centralized gateway that provides an interface between packet networks such as the Internet, or an X.25 network, and mobile communication networks (e.g., general system for mobile communication [GSM], universal mobile telecommunication system [UMTS], third generation partnership project long term evolution [3GPP LTE], wideband code division multiple access [WCDMA], and so on). Particularly in the case of the Internet, relatively few GGSNs exist, and yet are sophisticated entities configured to provide service for very large numbers of subscribers through the general packet radio service (GPRS) network to a variety of RANs. These GGSNs act as a mobile-to-Internet interface for UEs within a given geographic region (often, e.g., for a given state, country, regional union, or the like).

Device mobility during active data services is facilitated with a packet-based data structure stored at the GGSN (e.g., packet data protocol context [PDP context], packet data network connection [PDN connection], or the like). One example data structure comprises a PDP context that stores an IP address of a UE, its current serving node, and other information related to a particular traffic tunnel(s) or data stream(s) established for the UE. As the UE moves about geographically, and is served by different serving nodes, the data structure is updated to reflect the current serving node, enabling proper data routing to the UE.

Because conventional GGSNs are relatively large, centralized entities, various governments have established rules for law enforcement that track personal activity based on packet connections at the GGSN. In applicable jurisdictions therefore, the GGSN is configured to store UE movement (e.g., based on serving node identifiers), and potentially record information about Internet-related traffic, among other functions. Also, the GGSN can be configured to deny Internet service to select UEs by a similar mechanism.

Because a relatively small number of centralized GGSNs handle most if not all packet-related mobile communication traffic for a given geographic region, the GGSN is a very sophisticated and expensive entity. Typical problems can result from this type of centralized deployment, as well. For instance, hardware or software failures at the GGSN can affect packet network connectivity for a large number of users over a wide region. Simply rebooting the software of such a device can be very disruptive as well. Further, the centralized architecture creates a network weak point that can be exploited by data hackers, web pirates, and so on. Furthermore, individual service providers have little ability to customize packet-services at the GGSN, requiring support infrastructure for diversification of services.

Recently, proposals for local deployments of P-GWs have been initiated to reduce some of the inefficiencies of the centralized P-GW architecture. Local GWs can have similar functionality as a conventional P-GW, but comprise less expensive hardware resulting in cost-efficient replication of these entities throughout a RAN. Further, local GWs can be customized to a greater degree than conventional P-GWs by service providers. The local GW can link to the Internet or other packet networks, and provide packet services to a set of RAN base stations, including provider-deployed eNodeB (or other subscriber-deployed RAN base stations), or subscriber-deployed HeNB (or the like) base stations. The number of base stations served by a local GW, as well as traffic loading, and a geographical or topological coverage area thereof can vary from entity to entity (referred to herein as a coverage umbrella of a local GW).

With a co-existence of conventional and local GWs for packet services in mobile communications, arbitration between these P-GWs can be implemented. In one aspect of the subject disclosure, this arbitration mechanism is termed selected Internet Protocol traffic offload (SIPTO), and refers to offloading of packet traffic from a central P-GW to a local GW. Further to these aspects, arbitration between central and local GWs can be based on implemented on a per-UE basis, or a per-access point network (APN) basis, or a combination thereof. Various criteria can be established for determining whether to offload a particular packet-network connection from the central P-GW to a local GW, as is described in more detail herein. Examples include UE subscription status, government restrictions, APN capabilities, inter-network tariffs, and so forth.

Referring now to the figures, FIG. 1 illustrates a block diagram of an example wireless system 100 for implementing SIPTO for a local GW, or deployment of local GWs. Particularly, wireless system 100 comprises an IP traffic offload selection apparatus 102, configured to receive a request 110 for a packet network connection from a mobile communication network. In response to the request 110, IP traffic offload selection apparatus 102 is configured to determine whether request 110 will be served at a central P-GW or can be offloaded to a local GW, where available. Optionally, IP traffic offload selection apparatus 102 can also issue a packet network setup command 118 to the appropriate P-GW, once the above determination is made.

IP traffic offload selection apparatus 102 can comprise memory 104 for storing instructions that facilitate offloading IP traffic to local packet network gateways and a data processor 106 that executes modules to implement the instructions. Particularly, these modules can include a receiving module 108 that identifies a request for a connection to a packet network (e.g., an IP network such as the Internet) and that retrieves a set of subscription information for a UE initiating the request 110. The subscription information can be retrieved from a mobile network serving the UE (e.g., from a home location register [HLR], visitor location register [VLR], Home Subscriber Server [HSS] or the like), retrieved from memory 104 (e.g., where the subscription information is stored in memory 104 in response to a prior request 110 for packet connection and retrieval of the subscription information), or the like, or a suitable combination thereof.

Receiving module 108 forwards UE subscription information pertaining to the request 110 to a parsing module 112 that analyzes the subscription information and determines whether the UE is permitted to utilize local GW service. This determination can be based at least in part on a set of SIPTO rules 114 stored in memory 104. In one instance, SIPTO rules 114 can specify UE-specific criteria for determining whether the UE is permitted to utilize local GW service. An example of UE-specific criteria can include whether a subscription of the UE supports SIPTO and a status of the subscription, status of a SIPTO allowed/prohibited flag stored as part of the UE subscription data, or the like. In another instance, SIPTO rules 114 can specify APN-specific criteria for determining whether the UE is permitted to utilize local GW service. Examples of APN-specific criteria can include status of a SIPTO allowed/prohibited flag for a given APN that is stored as part of the UE subscription data, a quality of service (QoS) capability of an APN identified from the request 110 (e.g., see below), and so forth. In at least one aspect of the subject disclosure, permission can be based on a combination of UE-specific and APN-specific criteria.

If the UE is not permitted to utilize local GW service, IP traffic offload apparatus 102 can optionally issue the packet network setup command 118 and send it to a conventional P-GW (e.g., a GGSN), instead. If, on the other hand, the UE is permitted to utilize local GW service, data processor 106 can execute a reference module 116 that identifies a local GW to establish the connection to the IP network and that is associated with a base station providing mobile network service to the UE.

Reference module 116 can identify the local GW according to one or more of multiple mechanisms. For instance, reference module 116 can employ a data list that associates respective local GWs of a deployment of local GWs with respective sets of mobile network base stations, and cross reference the base station providing mobile network service to the UE with a local GW associated there with by the data list. In another aspect, reference module 116 can send a query (not depicted) to the base station, explicitly or implicitly requesting an identifier (e.g., an IP address) of the associated local GW. In still other aspects, reference module 116 can perform a domain name server (DNS) query in a format that enables a domain server to return a local GW that is geographically or topologically closes to the base station. In at least one case, the format can comprise an identifier of the UE or an identifier of the base station, for example.

It should be appreciated that IP traffic offload selection apparatus 102 can be implemented at various physical locations within a communication network. In one instance, IP traffic offload selection apparatus 102 can be implemented as part of a serving node of a packet core network (e.g., as part of a serving GPRS support node [SGSN] in a GSM/EDGE [enhanced data rate for GSM evolution] wireless system, a mobility management entity [MME] in a 3GPP LTE wireless system, or a like entity in other wireless systems). In another instance, IP traffic offload selection apparatus 102 can be implemented at a gateway between a mobile service provider's network and mobile core network. As yet another example, IP traffic offload selection apparatus 102 can be implemented at a P-GW, whether a local GW or a conventional P-GW such as a GGSN. In at least one aspect of the subject disclosure, IP traffic offload selection apparatus 102 can be implemented in a distributed fashion over a plurality of the foregoing or similar locations.

By providing arbitration between different P-GWs, wireless system 100 can facilitate traffic loading between conventional P-GWs and a deployment of local GWs, for instance. This can be important to comply with government regulations requiring cellular tracking conducted at a central GGSN, for instance. Thus, if a UE is subject to such tracking, wireless system can establish a packet connection at the GGSN, whereas other UEs not subject to these requirements can be routed to local GWs instead. Further, by customizing local GWs, different service providers can provide special packet network services to differentiate themselves from other service providers; UEs that meet hardware or software requirements of a customized local GW can be routed thereto, whereas UEs that do not meet these requirements can be routed elsewhere, and so on. Other benefits and uses can be derived from arbitration between different P-GWs as well, as will be apparent to one of ordinary skill in the art. These benefits and uses are considered part of the subject disclosure.

Figure 2:
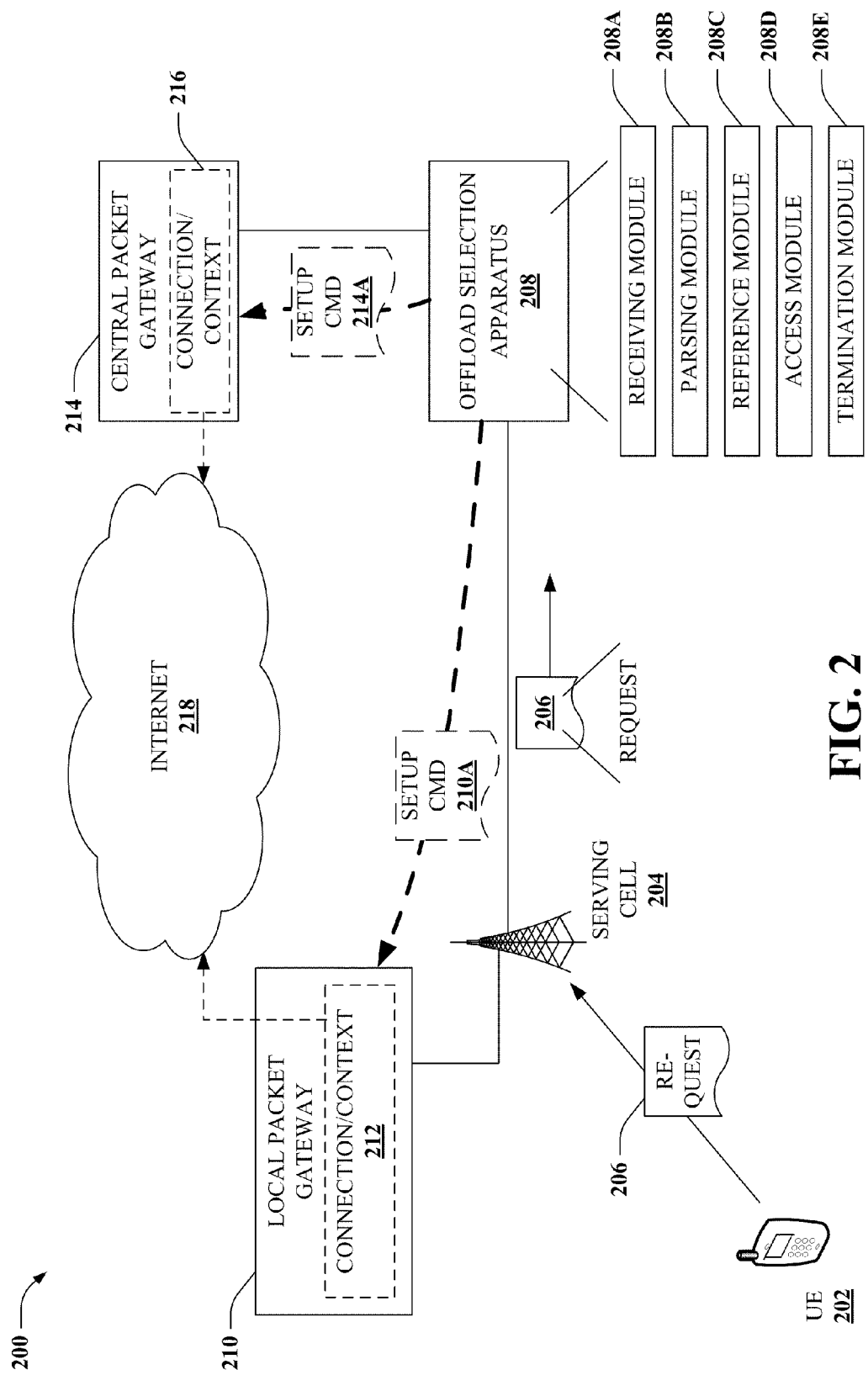
FIG. 2 illustrates a block diagram of an example wireless communication environment alternatively providing local or central Internet Protocol traffic.

FIG. 2 illustrates a block diagram of an example network environment 100 suitable for implementing SIPTO for mobile communications according to particular aspects of the subject disclosure. Network environment 100 can comprise a UE 202 communicatively coupled with a serving cell 204 via a wireless link. If configured for IP network services, UE 202 can issue a request 206 to establish a connection with an IP network, such as the Internet 218. Request 206 is received at serving cell 204, and forwarded to an offload selection apparatus 208. Examples of request 206 can include an activate packet data protocol (PDP) context request, a packet data network (PDN) connectivity request, or a like request suitable for various wireless network systems. In one aspect of the subject disclosure, offload selection apparatus 208 can be substantially similar to IP traffic offload selection apparatus 102 of FIG. 1, supra, although the disclosure is not limited to this aspect.

Offload selection apparatus 208 can comprise a receiving module 208A for receiving request 206 and extracting an identifier of UE 202 there from. Additionally, receiving module 208A can acquire a set of subscription information pertaining to SIPTO eligibility for UE 202 (e.g., from an HLR associated with UE 202, a VLR associated with serving cell 204, or another suitable network entity that stores subscription information for UE 202). Offload selection apparatus 208 can then execute a parsing module 208B that analyzes the subscription information and determines whether UE 202 is permitted to utilize SIPTO service.

A reference module 208C is employed that identifies a local GW 210 associated with serving cell 204 to establish the connection to Internet 218, if UE 202 is permitted to utilize the SIPTO service. In one example, reference module 208C performs a domain name server query (a DNS query) to identify local GW 210. In this example, reference module 208C creates a fully qualified domain name (a FQDN) that enables a domain name server to return the IP address of a local GW 210 that is geographically or topologically closest to serving cell 204 or UE 202. In at least one aspect of the subject disclosure, the FQDN is based at least in part on an identifier of the UE or an identifier of the base station. This identifier can enable the domain name server to perform a DNS lookup to retrieve the geographically or topologically closest local GW, for instance.

In an alternative example, reference module 208C can store a list of associations between local GW infrastructure providing access to one or more IP networks, and base station infrastructure of one or more mobile networks. Upon receiving request 206, reference module 208C extracts an identifier of serving cell 204 and references the identifier against the stored list. If the identifier of serving cell 204 is correlated with a local GW, such as local GW 210, reference module 208C retrieves this correlated local GW for establishing a packet network connection for UE 202. Thus, in this example reference module 208C can obtain a specific P-GW identifier associated with serving cell 204 from memory. In another instance, reference module 208C can send a request to serving cell 204 to identify one or more local GWs associated with serving cell 204, stored in memory at serving cell 204. Thus, where a DNS query or a stored list of local GW associations is not available or does not return a suitable result, reference module 208C can attempt to obtain the specified P-GW identifier from a base station forwarding a request for a packet connection.

In one example aspect of the subject disclosure, subscription information obtained by receiving module 208A includes a list of local GWs and respective permitted/unpermitted flags associated with respective local GWs of the list. The permitted/unpermitted flags indicate which local GWs UE 202 is permitted to utilize, and which local GWs UE 202 is not permitted to utilize. According to this aspect, parsing module 208B extracts a set of local GWs from the subscription information that UE 202 is permitted to access. An access module 208D is employed that compares an identifier of the local GW obtained from reference module 208C (e.g., as a result of a DNS query, retrieved from memory, or retrieved from serving cell 204) to the set of local GWs obtained from parsing module 208B to determine whether UE 202 is permitted to utilize local GW service in response to request 206.

In an alternative aspect, the subscription information pertaining to UE 202 includes a set of IP network access point names (APNs) that are associated with respective data flags that indicate whether UE 202 is allowed or prohibited from accessing respective IP networks through a local GW (e.g., a permitted/unpermitted flag, an allowed/prohibited flag, or other suitable terminology). In this case, offload selection apparatus 208 determines whether UE 202 can utilize SIPTO based on a status of an allowed/prohibited flag associated with a particular APN provided by serving cell 204, returned in response to the DNS query, or obtained from memory. Thus, in one specific implementation, offload selection apparatus 208 executes parsing module 208B and determines that UE 202 is permitted to utilize local GW service if an APN included in request 206 is associated with an allowed/prohibited flag set to allowed. According to further aspects of the subject disclosure, the allowed/prohibited flags of respective IP network APNs can be updated by a service provider network (not depicted) associated with UE 202, based on at least one of: subscription status of UE 202, government tracking requirements instituted for UE 202, radio bearer capabilities of an associated local GW, whether a tariff is charged by an operator of the associated local GW or an amount thereof, or the like, or a suitable combination thereof.

If UE 202 is determined to be eligible for local GW access, offload selection apparatus sends a packet network setup command 210A to local GW 210. Upon receiving setup command 210A, local GW 210 establishes a packet context/connection 212 (e.g., a PDP context via a create PDP context request, a PDN connection via a create session request, or the like) to Internet 218 at local GW 210, facilitating Internet communication with UE 202. Otherwise, if UE 202 is determined to be ineligible for local GW access, offload selection apparatus sends a packet network setup command 214A to central P-GW 214, which establishes a packet context/connection 216 to Internet 218 at central P-GW 214.

In at least one aspect of the subject disclosure, offload selection apparatus 208 can further comprise a termination module 208E that initiates deactivation of packet context/connection 212 or packet context/connection 216 upon expiration of a traffic timeout, or upon UE 202 moving outside of a service range of local GW 210. Further, this service range of local GW 210 can be determined from a list of base stations, tracking areas, routing areas, location areas, or radio access controllers, or a like proxy for service area suitable for a mobile RAN, that are explicitly or implicitly associated with local GW 210. Alternatively, the service area can be determined to be the set of cells for which a DNS query returns an identifier of local GW 210. In either case, when offload selection apparatus 208 determines that UE 202 has moved out of a service area of local GW 210, packet connection/context 212 established for UE 202 is terminated (e.g., a deactivate PDP context request for a PDP context, or delete bearer request for a PDN connection, or other suitable command). This automated termination can help to provide effective resource utilization of local GW 210, enhancing load capabilities of local GW 210, reducing excess power consumption, and so on.

Figure 3:
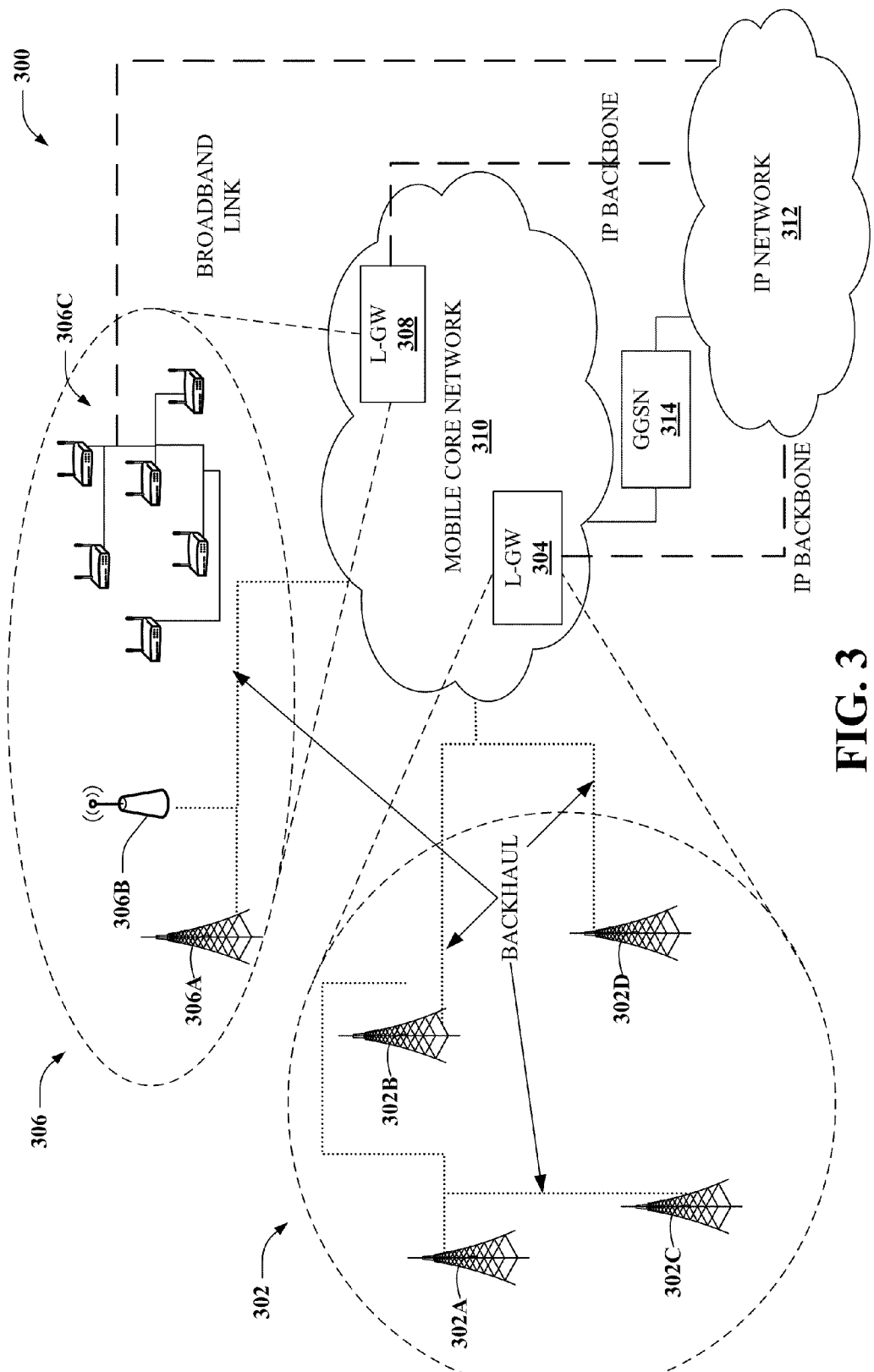
FIG. 3 depicts a block diagram of a sample wireless environment comprising a deployment of local packet gateways according to some aspects.

FIG. 3 illustrates a block diagram of an example mobile networking environment 300 according to further aspects of the subject disclosure. Mobile networking environment 300 can comprise a base station serving area 302 and an associated local GW 304, as well as another base station serving area 306 with an associated other local GW 308. Local GW 304 and local GW 308 can be part of a common packet gateway deployment (established, for instance, by a single mobile network service provider, Internet service provider [ISP], or the like) or associated with independent packet gateway deployments. In either case, the local GWs are associated with respective base station service areas 302 and 306. Base station service area 302 comprises a planned deployment of macro base station towers, including macro base station 302A, macro base station 302B, macro base station 302C and macro base station 302D. Base station service area 306, on the other hand, is a semi-planned deployment comprising a provider-deployed macro base station 306A and micro base station 306B, as well as a set of subscriber-deployed base stations 306C.

Local GW 304 and local GW 308 are part of mobile core network 310 and are further communicatively coupled with one or more IP networks 312 (e.g., the Internet or a private intranet, an X.25 network, or other suitable packet-based communication network) via respective IP backbones indicated by the dashed lines coupling Internet 312 with local GW 304 and local GW 308, respectively. Provider-deployed base stations, including macro base stations of base station serving area 302, and macro base station 306A and micro base station 306B of base station serving area 306 are coupled via a backhaul link to mobile core network 310, indicated by the dotted lines between mobile core network 310 (e.g., GSM core network, UMTS core network, 3GPP LTE core network, and so on) and the respective base stations. Although only a single mobile core network 310 is depicted in mobile networking environment 300, it is to be appreciated that one or more of base stations 302A, 302B, 302C, 302D, 306A or 306B could be coupled with one or more other mobile core networks (via other backhaul links—not depicted), in addition, or instead. Mobile networking environment 300 is not limited to a number or type of mobile core networks, however. Additionally, subscriber-deployed base stations 306C are coupled via one or more broadband IP links to one or more IP networks, such as Internet 312.

Mobile core network 310 communicatively couples with IP network 312 through GGSN 314. This enables mobile core network 310 to communicate with subscriber-deployed base stations 306C, and also enables mobile core network 310 to facilitate access to IP network 312 for base station service area 302 and base station service area 306. Furthermore, mobile core network 310 can also facilitate access to IP network 312 via local GW 304 and local GW 308, as described herein. Selection between GGSN 314 and local GW 304 or local GW 308 can be implemented within mobile core network 310, at GGSN 314, or at respective base stations of base station service area 302 or base station service area 306, or another suitable implementation. In at least one aspect, selection between GGSN 314 and local GW 304 or local GW 308 can be distributed over a plurality of the foregoing positions. In either case, criteria for selecting between GGSN 314 and a local GW can be implemented on a per-UE and a per-APN basis.

According to various aspects of the subject disclosure, subscriber data pertaining to a particular UE can indicate whether access to local GW 304 or local GW 308 is permitted. UE and APN permissions can be set in subscriber data and updated by a mobile service provider to reflect changes in UE or APN permissions. Thus, for instance, where a government agent requires UE tracking for a particular subscriber, APN permissions can be set to unpermitted for a UE utilized by the particular subscriber. IP network connections for this subscriber would then be established via GGSN 314 (having mandated tracking software, for instance) rather than via local GW 304 or local GW 308. As another example, if the mobile service provider does not have a tariff agreement with a local GW deployment owned by an ISP, for instance, local GWs associated with the local GW deployment (e.g., local GW 304) can be set to unpermitted for all UEs. Accordingly, a UE operating within mobile networking environment 300 will be routed to a local GW only within base station service area 306, in this example. In yet another example, if the particular subscriber maintains a subscription service that authorizes local GW service for one set of APNs but not for a second set of APNs, the subscription information can be set to permitted for local GWs (e.g., local GW 308) associated with the one set of APNs, and set to unpermitted for local GWs (e.g., local GW 304) associated with the second set of APNs, and so on. It should be appreciated that other example implementations known to one of skill in the art, or made known to one of skill in the art by way of the context provided herein, are considered within the scope of the subject disclosure.

Figure 4:
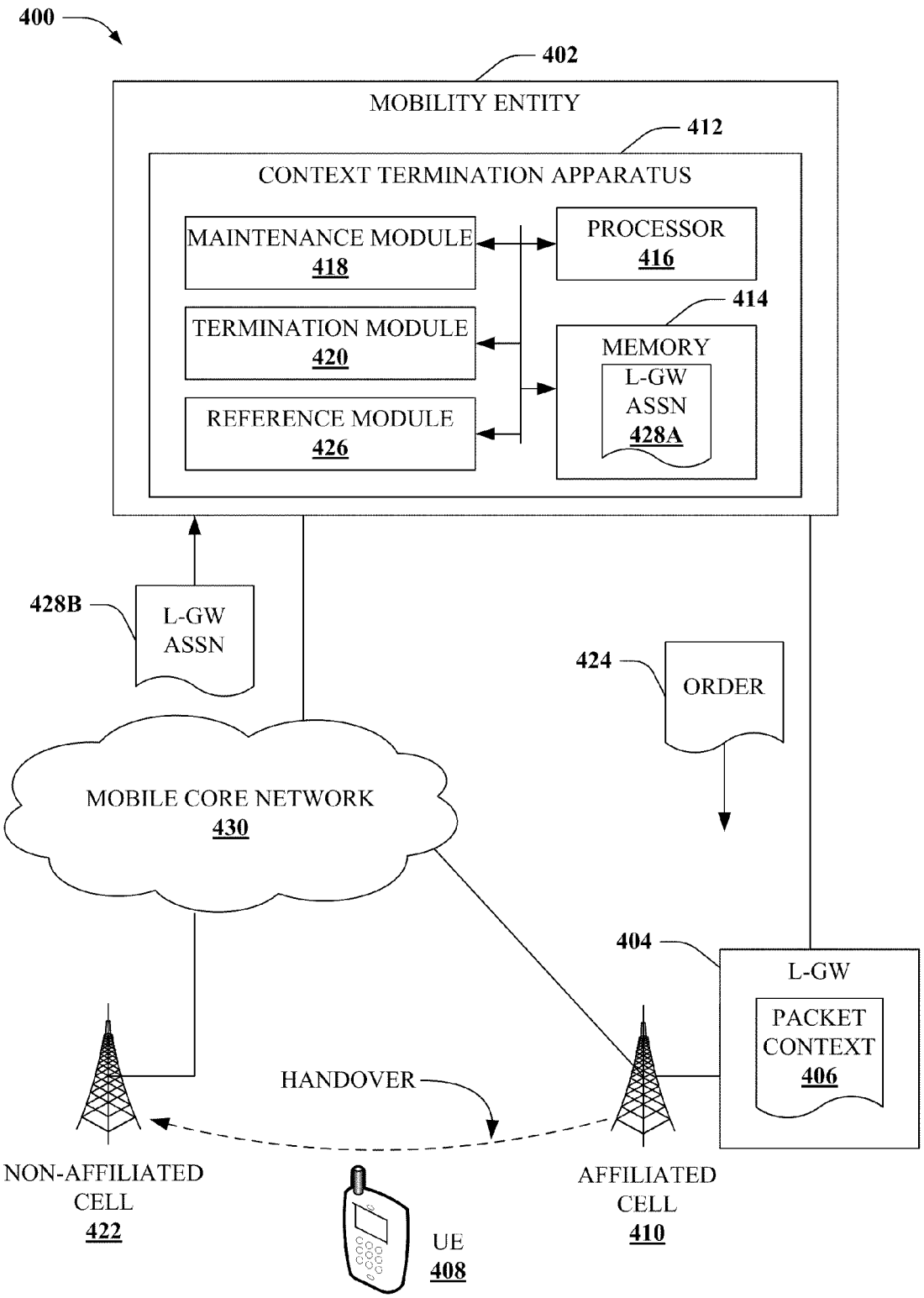
FIG. 4 illustrates a block diagram of an example apparatus for managing local packet connections according to additional aspects of the subject disclosure.

FIG. 4 depicts a block diagram of an example wireless system 400 according to still other aspects of the subject disclosure. Particularly, wireless system 400 can comprise a mobility entity 402 configured to manage packet connections established at one or more local GWs. Managing packet connections can include monitoring respective connections for traffic timeouts, terminating timed-out or otherwise unused connections, and instigating re-activation of terminated packet connections that are not timed-out or unused, or that meet a suitable reactivation criteria. Mobility entity 402 therefore can provide a mechanism for promoting efficient resource utilization of packet gateways utilized for mobile network packet services.

As depicted, wireless system 400 can comprise a local GW 404 having a packet connection 406 established for a UE 408 at a mobile cell affiliated with local GW 404 (referred to as affiliated cell 410). Additionally, wireless system 400 can comprise a second mobile cell that is not affiliated with local GW 404 (outside a service area of local GW—referred to as non-affiliated cell 422). Affiliated cell 410 and non-affiliated cell 422 are coupled with a mobile core network 430.

Mobility entity 402 can comprise memory 414 for storing instructions configured for management and removal of active data network connections associated with a RAN, and a data processor 416 for executing modules that implement the instructions. Particularly, the modules can comprise a maintenance module 418 that identifies an established connection, e.g., packet connection 406, at local GW 404 that serves the RAN (e.g., comprising affiliated cell 410). Further, mobility entity 402 can comprise a termination module 420 that initiates a deactivation of packet connection 406 if a UE identified with the packet connection (e.g., UE 408) is actively coupled with a wireless node of the RAN that is outside of a service area of local GW 410.

In one particular aspect of the subject disclosure, maintenance module 418 determines, or receives a determination from mobile core network 430 for instance, that UE 408 has conducted a handover to non-affiliated cell 422, or has accessed non-affiliated cell 422 from idle state. In this case, maintenance module 418 scans local GW 404 (and optionally other local GWs—not depicted—within a given local GW deployment, associated with a particular APN, associated with a particular mobile network, or the like not depicted) to identify whether a packet connection exists for UE 408. If such packet connection exists, maintenance module 418 sends a command to termination module 420, which in turn initiates deactivation of packet connection 406.

According to another aspect, maintenance module 418 forwards a reactivation command to UE 408 upon termination of packet connection 406. Maintenance module 418 can be triggered to forward the reactivation command based on one or more criteria. As one example, maintenance module 418 forwards the reactivation command in response to rebooting of local GW 404, load balancing of local GW 404 and one or more other P-GWs (which can include local GWs or central P-GWs—not depicted), or UE 408 activating a connection outside of the service area of local GW 404, or a suitable combination thereof. The reactivation command can be employed to cause UE 408 to re-establish packet connection 406 at local GW 406 or through non-affiliated cell 422 as a result of non-UE termination of the packet connection. This can reduce session interruption, improving overall reliability of packet-based services employed by UE 408.

In various other aspects, mobility entity 402 can further comprise a reference module 426 that is configured to determine whether the wireless node (non-affiliated cell 422) is outside the service area of local GW 404. This can be accomplished in one or more of several implementations. In one implementation, reference module 426 performs a DNS query for UE 408, or for the wireless node, and retrieves a current local GW associated with UE 408 or with the wireless node. This can be accomplished, for instance, based on a FQDN that enables a domain name server to return the current local GW that is geographically or topologically closest to the wireless node. Reference module 426 then compares an identifier of local GW 404 with a second identifier of the current local GW. Based on the comparison, reference module 426 determines the wireless node to be within the service area if the identifier and the second identifier are the same. In such case, packet connection 406 is not terminated by mobility entity 402. If the identifier and the second identifier are not the same, reference module infers that packet connection 406 is no longer active at local GW 404, and termination module 420 therefore initiates termination of packet connection 406.

In an alternative or additional implementation, reference module 426 acquires a data set that correlates wireless nodes within the service area to local GW 404. In this case, reference module 426 checks whether the wireless node of the RAN is correlated with local GW 404. If so, packet connection 406 is maintained. Otherwise, termination module 420 initiates deactivation of packet connection 406 instead.

Figure 5:
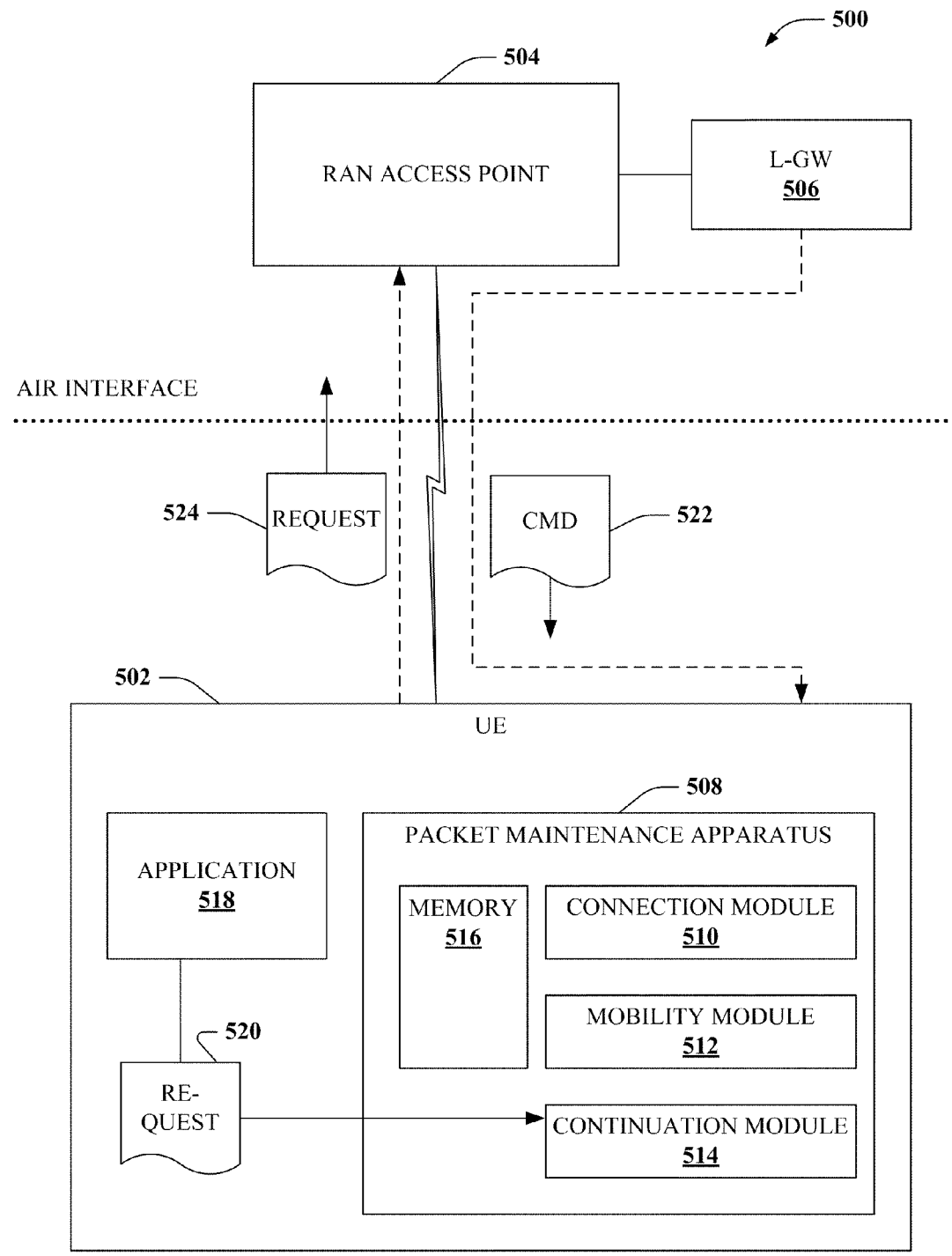
FIG. 5 illustrates a block diagram of a sample wireless communication apparatus for employing IP traffic in a SIPTO deployment according to further aspects.

FIG. 5 illustrates a block diagram of an example wireless environment 500 for facilitating IP network services in a mobile operating environment according to additional aspects of the subject disclosure. Wireless environment 500 comprises a UE 502 communicatively coupled with a RAN access point 504, such as an eNodeB, a Node B, a Home Node B (HNB), a Home eNode B (HeNB), or the like, over an air interface. Additionally, UE 502 can have a packet network connection maintained by a local GW 506 associated with RAN access point 504.

UE 502 can comprise a packet maintenance apparatus 508 that employs a connection module 510 that receives a command 522 to deactivate the packet network connection that is established at a selected SIPTO gateway (e.g., local GW 506). Additionally, UE 502 can execute a continuation module 514 that initiates a request 524 to reactivate the packet network connection if a cell identifier of a current serving cell (e.g., RAN access point 504) is different from a most recent cell identifier associated with the packet network connection. Thus, where RAN access point 504 is not an access point that originates the packet network connection, or is not the most recent access point serving UE 502, continuation module 514 can automatically initiate the request 524 to reactivate the packet network connection. Further, in one aspect of the subject disclosure, continuation module 514 can initiate the request 524, whereas in other aspects an application 518 operating on UE 502 can initiate an internal request 520 to reactivate the packet network connection, which is forwarded to RAN access point 504 by continuation module 514. In at least one other aspect, connection module 510 receives an explicit reactivation command from RAN access point 504 or local GW 506, and triggers continuation module 514 to send request 524 in response to the explicit reactivation command.

In a particular aspect of the subject disclosure, UE 502 can comprise a mobility module 512 that detects a handover or an active link from idle state to RAN access point 504. In this case, receiving the command 522 to deactivate results at least in part from the handover or the active link from idle state. Furthermore, continuation module 514 determines whether the current serving cell is outside of a service range of the SIPTO gateway upon detection of the handover, and issues request 524 to reactivate the packet network connection if the current serving cell is indeed outside of the service range. As described, packet maintenance apparatus 508 can be configured to reactivate or maintain the packet network connection when UE 502 conducts a handover to an access point that is outside of the service range of local GW 506. Also, packet maintenance apparatus 508 can be configured to identify a reactivation command issued by a mobile network serving UE 502, and issue the request 524 to reactivate the packet network connection in response to the reactivation command. As a result, UE 502 can be less subject to loss of data services supported by a local GW in the case of a handover, rebooting of local GW 506, or packet connection load balancing between local GW and another P-GW (not depicted).

Figure 6:
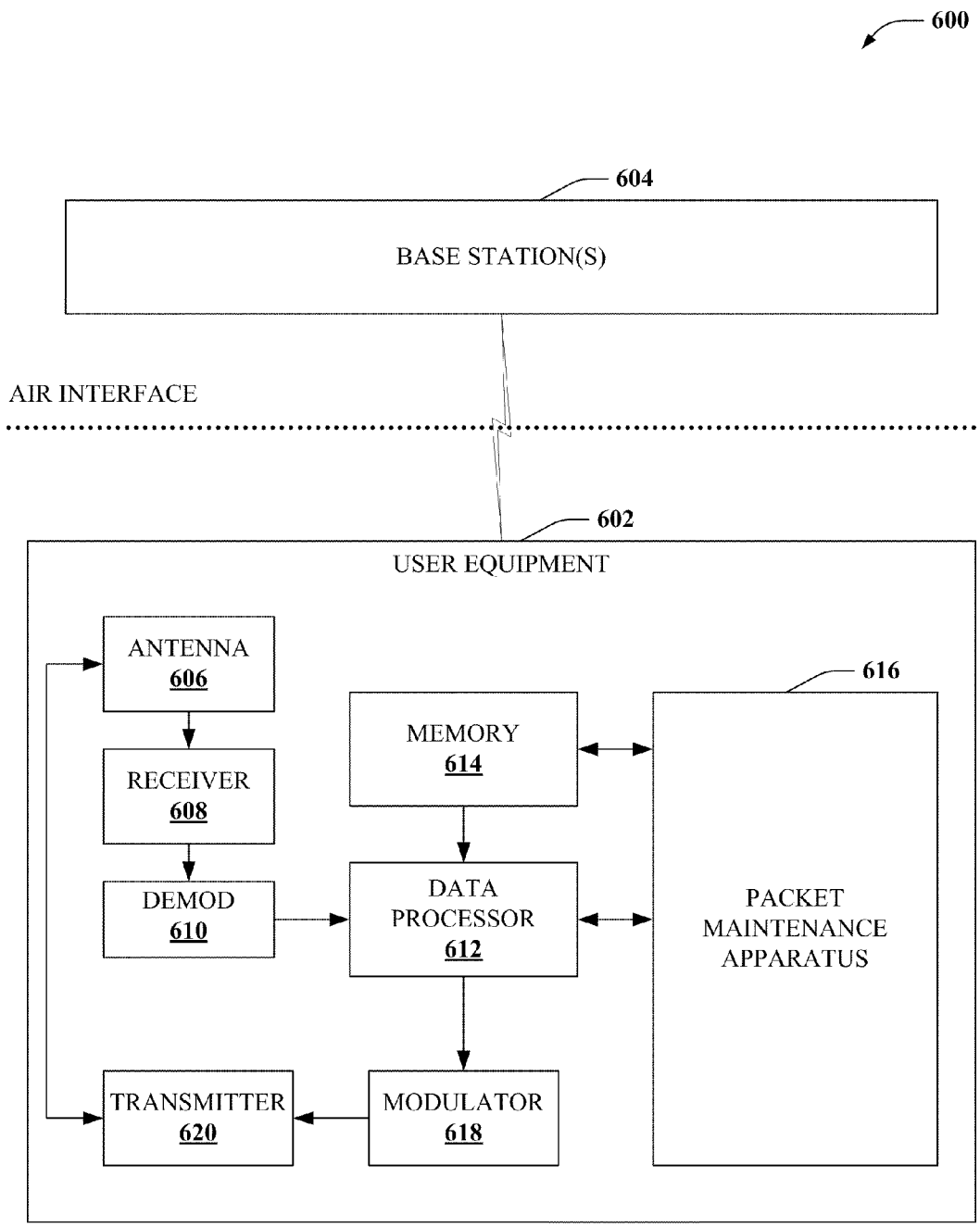
FIG. 6 depicts a block diagram of an example user equipment configured for maintaining a packet connection in a local packet gateway (P-GW) deployment.

FIG. 6 illustrates a block diagram of an example wireless communication system 600 comprising a UE 602 according to one or more additional aspects of the subject disclosure. UE 602 can be configured to wirelessly communicate with one or more base stations 604 (e.g., access point(s)) of a wireless network. Based on such configuration, UE 602 can receive wireless signals from base station(s) 604 on one or more forward link channels and respond with wireless signals on one or more reverse link channels. In addition, UE 602 can comprise instructions stored in memory 614 configured to maintain packet network services in a mobile access environment, and a data processor 612 that executes a packet maintenance apparatus 616 that implements these instructions, as described herein (e.g., see FIG. 6, supra). Particularly, packet maintenance apparatus 616 can initiate a request to reactivate a packet network connection facilitated by base station(s) 604 in the event that UE 602 conducts a handover from one base station(s) 604 to another, upon request from an application operating on UE 602, upon premature termination of the packet network connection, or upon receipt of a network command to reactivate the packet network connection.

UE 602 includes at least one antenna 606 (e.g., comprising one or more input/output interfaces) that receives a signal and receiver(s) 608, which perform typical actions (e.g., filters, amplifies, down-converts, etc.) on the received signal. In general, antenna 606 and a transmitter 620 (collectively referred to as a transceiver) can be configured to facilitate wireless data exchange with base station(s) 604.

Antenna 606 and receiver(s) 608 can also be coupled with a demodulator 610 that can demodulate received symbols and provide demodulated symbols to data processor(s) 612 for evaluation. It should be appreciated that data processor(s) 612 can control and/or reference one or more components (antenna 606, receiver 608, demodulator 610, memory 614, packet maintenance apparatus 616, modulator 618, transmitter 620) of UE 602. Further, data processor(s)

612 can execute one or more modules, applications, engines, or the like that comprise information or controls pertinent to executing functions of UE 602. Additionally, memory 614 of UE 602 is operatively coupled to data processor(s) 612. Memory 614 can store data to be transmitted, received, and the like, and instructions suitable to conduct wireless communication with a remote device (e.g., base station(s) 604).

The aforementioned systems have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a system could include serving cell 102 comprising interference mitigation apparatus 604, and UE 702 coupled with RQI apparatus 710, or a different combination of these or other entities. Sub-modules could also be implemented as modules communicatively coupled to other modules rather than included within parent modules. Additionally, it should be noted that one or more modules could be combined into a single module providing aggregate functionality. For instance, signal allocation module 612 can include transmission module 614, or vice versa, to facilitate instructing a UE to measure interference on a UE-specific pilot of another UE, and transmitting the instruction to the UE, by way of a single module. The modules can also interact with one or more other modules not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 7:
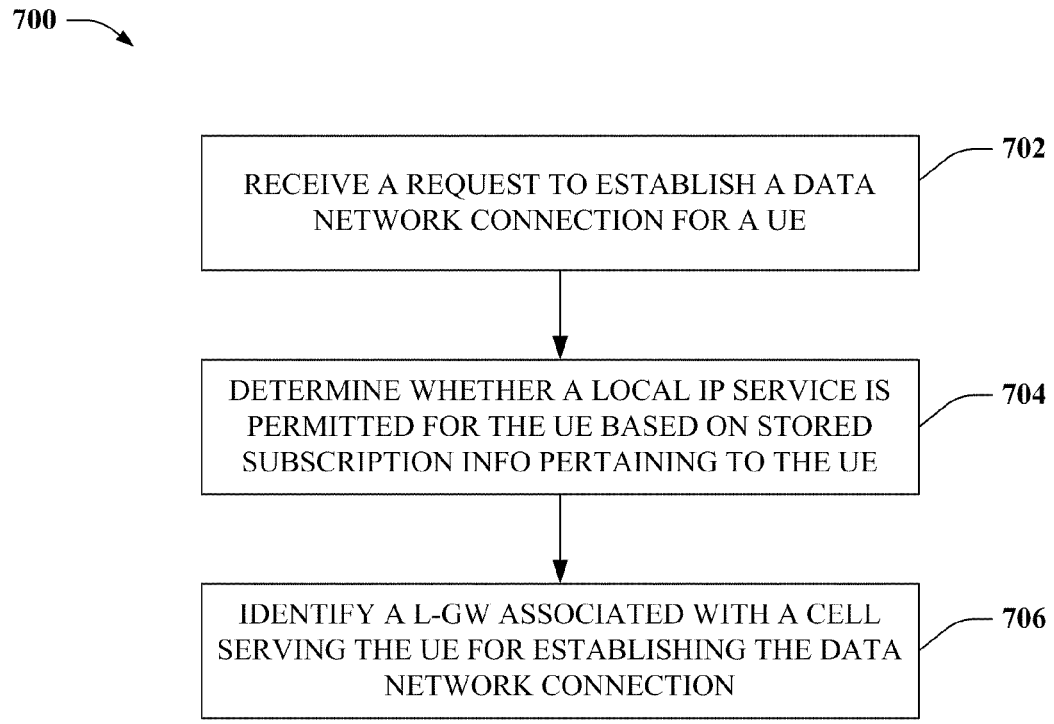
FIG. 7 illustrates a flowchart of an example methodology for implementing SIPTO in mobile communications according to one or more aspects.

FIG. 7 illustrates a flowchart of a sample methodology 700 according to additional aspects of the subject disclosure. At 702, method 700 can comprise receiving a request to establish a data network connection for a UE coupled with a mobile network. Further, at 704, method 700 can comprise determining whether a local IP traffic service is permitted for the UE based on a set of stored subscription information pertaining to the UE. In one instance, the local IP traffic service can pertain to a SIPTO service for accessing a data packet network via a local GW instead of a central GGSN or central P-GW. In another instance, the local IP traffic service can pertain to initiating a local IP access (LIPA) communication between the UE and a local IP network, such as a WiFi network with one or more wireless IP routers, or a wide area IP network with a wide area network wireless router (e.g., wireless interoperability for microwave access [WiMAX]).

Moreover, at 706, method 700 can comprise identifying a local data network gateway associated with a cell or an access point of the mobile network serving the UE for establishing the data network connection if the SIPTO is permitted. By referencing the subscription information, SIPTO can be enabled on a UE-by-UE basis, for one or more UEs supported by a mobile service provider. In at least one aspect of the subject disclosure, the subscription information is updated on a semi-static basis based on radio bearer capabilities of an APN specified with the request, subscription status of the UE, a tariff rate associated with the local data network gateway, or a suitable combination thereof. In this aspect(s), SIPTO can be enabled for the UE based on a status of one or more of the foregoing criteria specified in the subscription information. In at least on additional aspect of the subject disclosure, determining whether the SIPTO is permitted for the UE at least in part comprises determining whether content tracking requirements associated with the UE, if any, are supported by the local data network gateway.

In some disclosed aspect, determining whether the SIPTO is permitted for the UE can additionally comprise determining whether the SIPTO is permitted for an APN specified with the request, and rejecting the request if the SIPTO is not permitted for the APN. In a particular aspect, determining whether the SIPTO is permitted for the APN further comprises identifying whether the APN meets a QoS requirement of traffic associated with the request. In another aspect, determining whether the SIPTO is permitted for the APN comprises determining whether charging requirements associated with the request are supported by the local data network gateway.

In still other aspects of the subject disclosure, identifying the local data network gateway further comprises performing a DNS query. Performing the DNS query can additionally comprise forming a FQDN comprising an indicator that enables a DNS to retrieve a proximate local data network gateway that is geographically or topologically closest to a mobile network cell serving the UE, and return the proximate local data network gateway in response to the DNS query. In a specific aspect, the indicator is based on an identifier of the UE and specifies whether a subscription of the UE allows the SIPTO, or is based on an identifier of the cell or the access point of the mobile network and implies a capability of the local data network gateway to support the network connection, or a combination thereof.

In an alternative aspect, identifying the local data network gateway further comprises referencing a mobile network cell serving the UE to obtain a data set that associates mobile network access points of the mobile network with local data network gateways. In this aspect, identifying the local data network gateway can be accomplished by matching the mobile network cell to an associated local data network gateway in the data set. According to at least one further aspect, method 700 can additionally comprise initiating deactivation of the data network connection upon expiration of a traffic timeout, or upon the UE moving out of a range of cells of the mobile network that are served by the local data network gateway. In this latter aspect, resources of the local data network gateway can be preserved by terminating data network connections that are no longer utilized by UEs served by the mobile network.

Figure 8:
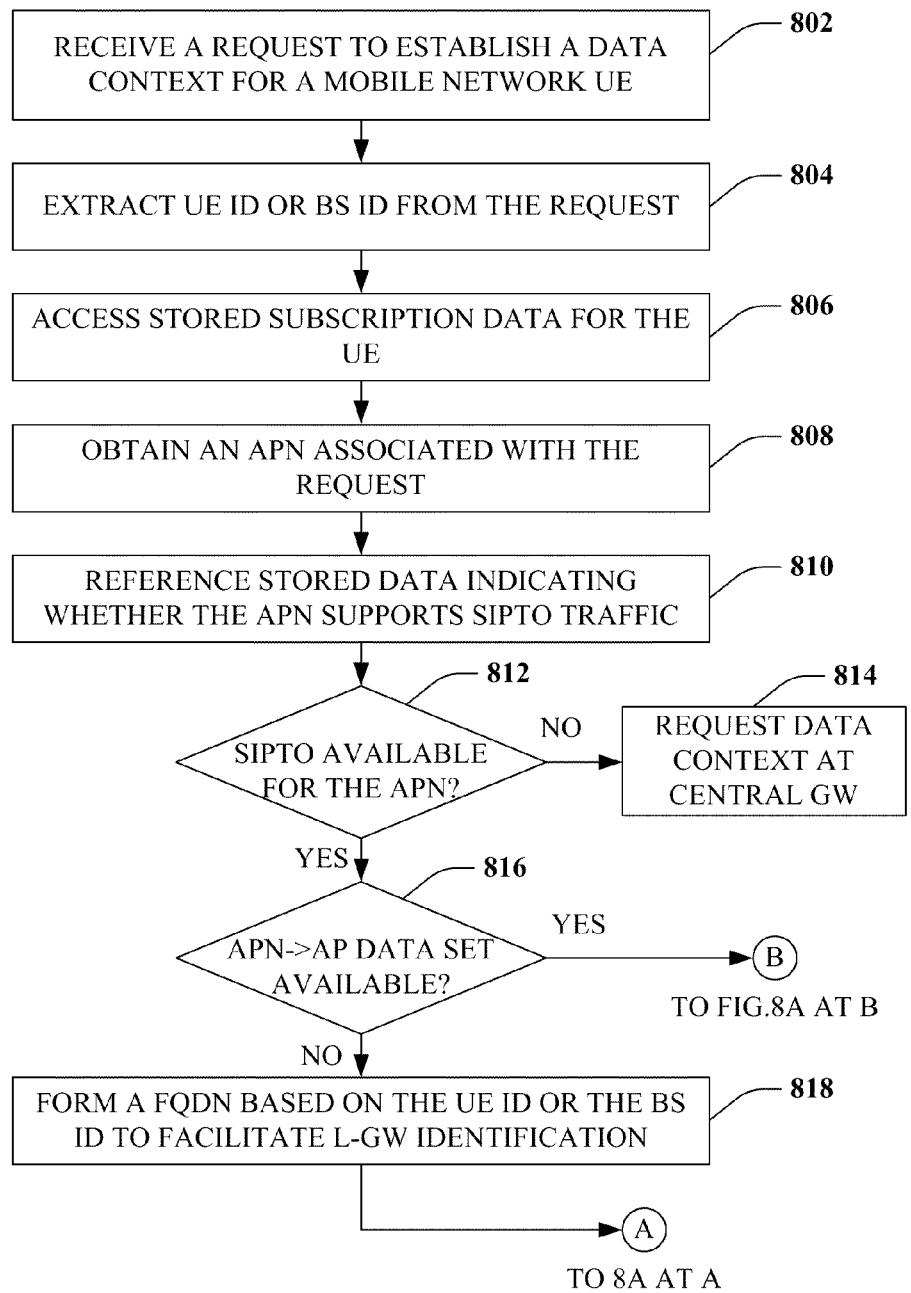
FIGS. 8 and 8A depict a flowchart of a sample methodology for providing SIPTO on a per user equipment or per access point name basis.
Figure 8A:
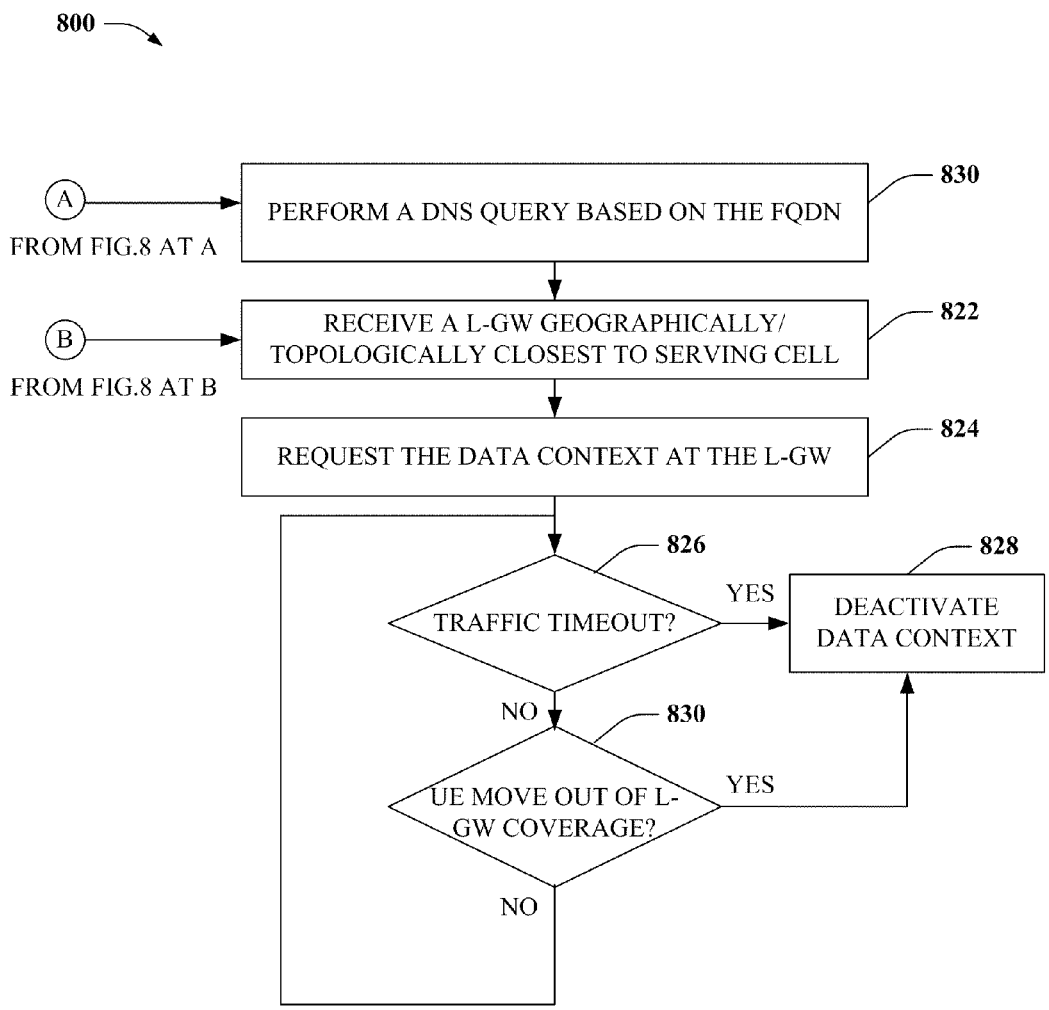

FIGS. 8A and 8B illustrate a flowchart of a sample methodology 800 according to still other aspects of the subject disclosure. At 802, method 800 can comprise receiving a request to establish a data context for a mobile network UE. At 804, method 800 can comprise extracting a UE ID or base station ID from the request. Additionally, at 806 method 800 can comprise accessing stored subscription data for the UE in response to receiving the request.

At 808, method 800 can obtain an APN associated with the request. At 810, method 800 can comprise referencing stored data indicating whether the APN supports SIPTO traffic. At 812, method 800 can determine whether SIPTO is available for the APN. If not, method 800 proceeds to 814 and requests the data context for the UE at the central P-GW. Method 800 can end after reference number 814. If SIPTO is available for the APN, method 800 can instead proceed to 816, where another determination is made as to whether a data set is available correlating APNs with access points of a mobile network serving the UE. Particularly, the data set can comprise subscription information for the UE indicating whether SIPTO is permitted or prohibited for respective APNs. By referencing the data set, an APN associated with a base station serving the UE can be identified, and based on a SIPTO allowed/prohibited flag associated with the APN, method 800 can determine whether the UE can be offloaded to a local GW.

If the data set is available, method 800 can proceed to 822 at FIG. 8A, otherwise method 800 proceeds to 818 and forms a FQDN based on the UE ID or the base station ID. The FQDN is used to facilitate identifying a local GW to serve the UE. Method 800 then proceeds to 820 at FIG. 8A.

At 822 of FIG. 8A, method 800 can comprise performing a DNS query based on the FQDN formed at reference number 820. At 822, method 800 can comprise receiving a local GW geographically or topologically closest to a cell serving the UE. At 826, method 800 can comprise requesting the data context be established at the local GW. At 828, method 800 can comprise determining whether a traffic timeout pertaining to the data context has occurred. If so, method 800 proceeds to 830 and deactivates the data context, ending method 800; otherwise method 800 proceeds to 832 and determines whether the UE has moved out of a service area of the local GW. If the UE has moved out of the service area, method 800 proceeds to 830 and deactivates the data context; otherwise method 800 returns to reference number 828.

Figure 9:
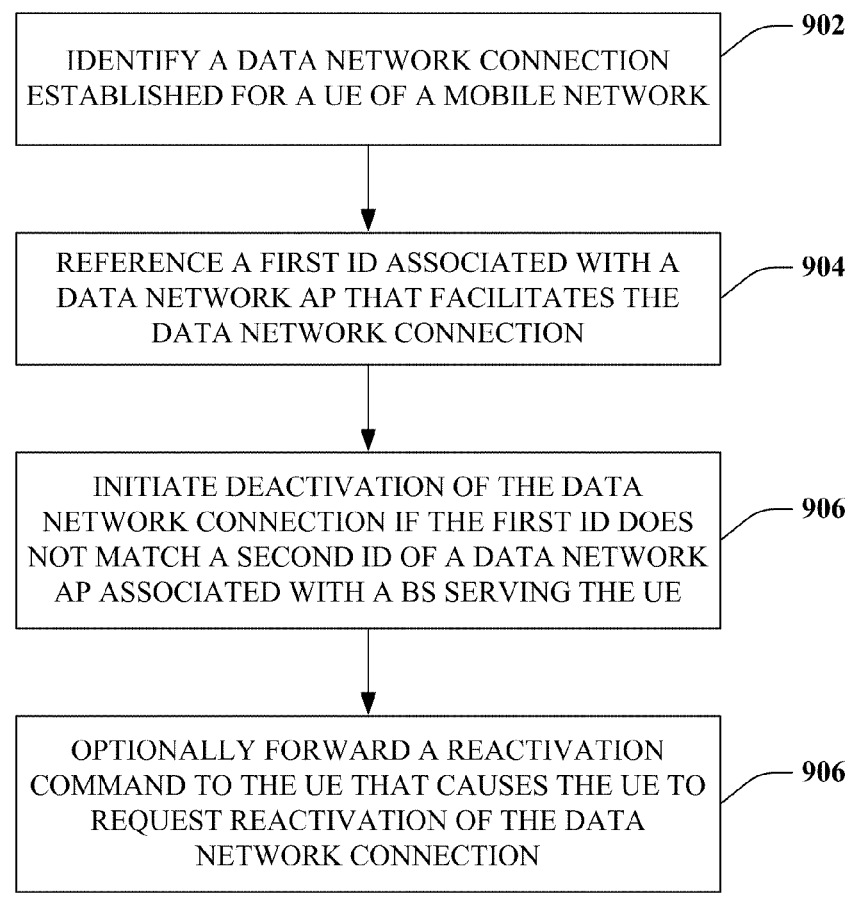
FIG. 9 illustrates a flowchart of a sample methodology for managing data network connections for a local packet gateway deployment in additional aspects.

FIG. 9 illustrates a flowchart of an example methodology 900 for managing packet contexts for mobile communication subscribers according to one or more other aspects of the subject disclosure. At 902, method 900 can comprise identifying a data network connection established for a UE that receives wireless service from a mobile network base station. At 904, method 900 can comprise referencing a first identifier associated with a data network access point that facilitates the data network connection. At 906, method 900 can further comprise initiating deactivation of the data network connection if the first identifier does not match a second identifier of a data network access point associated with the mobile network base station. In at least one disclosed aspect, the first identifier and the second identifier comprise respective first and second IP addresses and the initiating deactivation is conditioned on the first and second IP addresses being non-identical.

Further to the above, matching the first identifier and the second identifier can comprise performing a DNS query for the mobile network base station, or for the UE. Additionally, method 900 can comprise retrieving an access point identifier in response to the DNS query, and employing the access point identifier as the second identifier. In this aspect, method 900 compares an identifier of the data network access point (e.g., a local GW) to a second data network access point identifier returned in response to the DNS query. Further, performing the DNS query can additionally comprise forming a FQDN that facilitates identifying a local packet gateway that is geographically or topologically nearest to the mobile network base station, wherein the FQDN is based on an identifier of the UE or an identifier of the mobile network base station. Since the DNS query will return an identifier associated with a current mobile access point (e.g., the mobile network base station), the second identifier should correspond to a current data network gateway serving the UE. Accordingly, method 900 in effect can compare a data network gateway facilitating, maintaining, establishing, etc., the data network connection with a data network gateway currently serving the UE, and, if they are non-identical, initiate deactivation of the data network connection.

In an alternative aspect of the subject disclosure, matching the first identifier and the second identifier further comprises referencing a list of data network access point identifiers associated with the mobile network base station and determining whether the first identifier is included in the list of data network access point identifiers. According to this aspect, the list of data network access point identifiers comprises respective mobile network tracking areas, mobile network location areas, mobile network routing areas, base station identifiers or radio network controller identifiers, or the like, or a suitable combination thereof. These data network access point identifiers are uniquely or pseudo-uniquely (unique within a context of access point identifiers for a particular APN, or instance) distinguish one or more data network access points associated with the mobile network base station from data network access points associated with other mobile network base stations.

In an additional aspect, initiating deactivation further comprising initiating a deactivation request and sending the deactivation request to the UE if the first identifier does not match the second identifier. In this case the UE can terminate UE-initiated communications related to the data network connection, or can refrain from attempting to reactivate the data network connection, absent a separate application request to establish a second data network connection, for example. In yet another aspect, initiating deactivation further comprises initiating a deactivation request and sending the deactivation request to a network entity that manages the data network connection, if the first identifier does not match the second identifier. It should be appreciated that the deactivation request can be sent to the UE and to the network entity in at least one further aspect.

In another alternative aspect, method 900 can comprise determining whether the UE is conducting or has conducted a handover to the mobile network base station. If the UE has conducted a handover, this can trigger initiating deactivation of the data network connection as a result of the handover. Further to the above, at 908, method 900 can additionally comprise forwarding a reactivation command to the UE that causes the UE to request reactivation of the data network connection at the data network access point associated with the mobile base station. Sending the reactivation command can be in response to premature termination of the data network connection, for instance. Such an event could be caused by a software reboot at a data network access point facilitating the data network connection, power shut-down at the data network access point, or another suitable termination.

Figure 10:
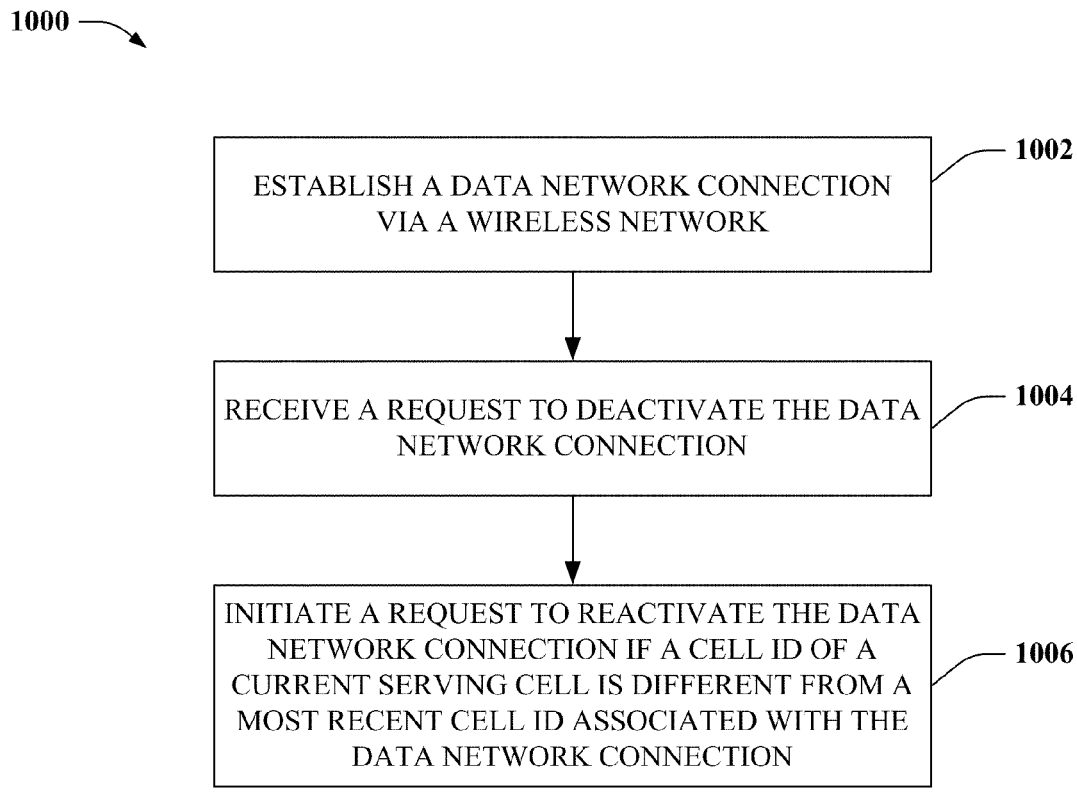
FIG. 10 depicts a flowchart of an example methodology for utilizing packet connections in a mobile network in further aspects of the subject disclosure.

FIG. 10 illustrates a flowchart of a sample methodology 1000 for facilitating and maintaining a data network connection in mobile communications. At 1002, method 1000 can comprise establishing a data network connection via a wireless network. At 1004, method 1000 can comprise receiving a request to deactivate the data network connection. At 1006, method 1000 can comprise initiating a request to reactivate the data network connection if a cell identifier of a current serving cell is different from a most recent cell identifier associated with the data network connection. In one instance, initiating the request further comprises determining that the current serving cell is outside of a service range of a local data network gateway supporting the data network connection. This determination can result from the cell identifier and most recent cell identifier not matching, in one case, or from determining that a different local packet network gateway serves the current serving cell and the most recent cell. In one example aspect, method 1000 can comprise performing a handover to a neighboring cell, wherein receiving the request to deactivate results at least in part from performing the handover. In another example aspect, method 1000 can comprise receiving a reactivation command for the data network connection, and comparing the cell identifier with the most recent cell identifier as a result of receiving the reactivation command. Thus, performing the handover or receiving the reactivation command can potentially trigger initiating the request to reactivate, optionally subject to a difference in the respective identifiers of the current serving cell and most recent cell.

Figure 11:
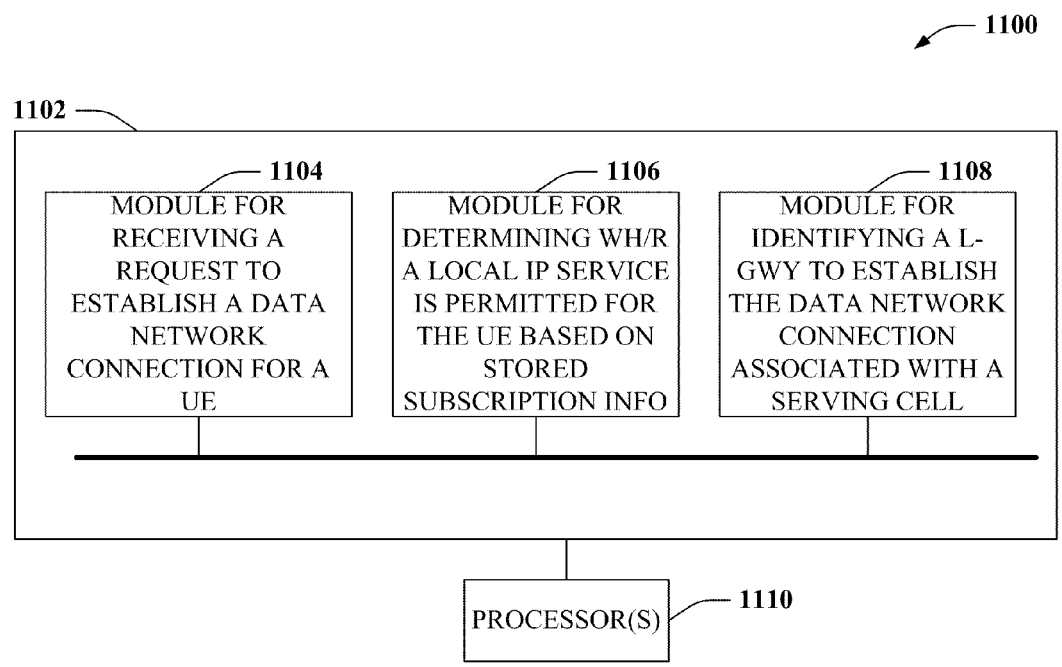
FIG. 11 illustrates a block diagram of a sample apparatus configured for SIPTO data services for a local GW deployment in another aspect.
Figure 12:
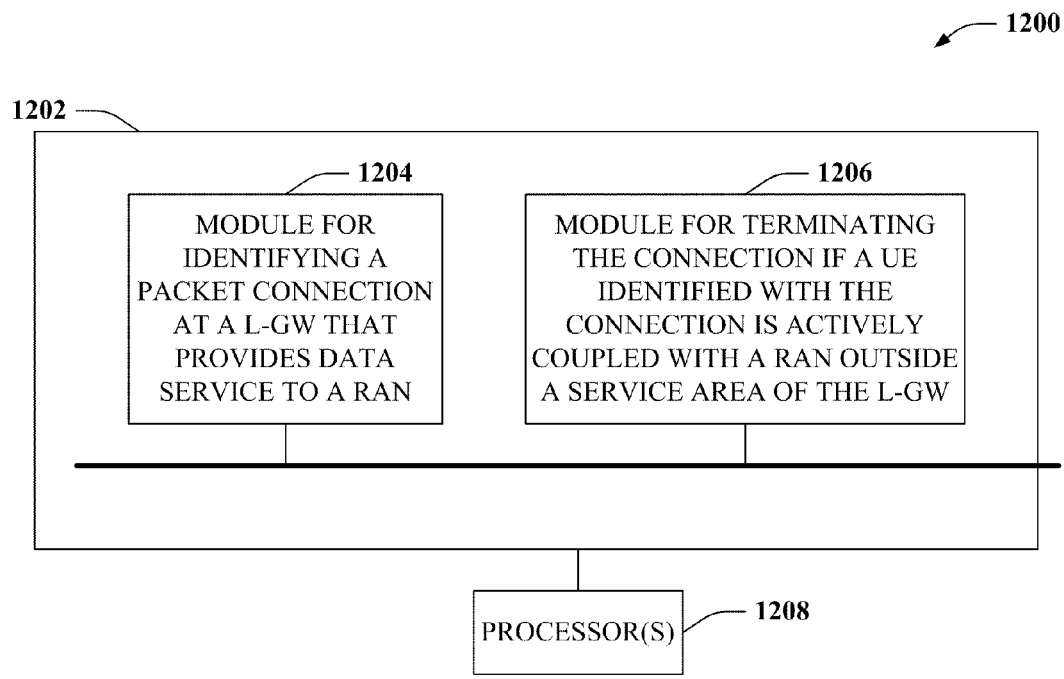
FIG. 12 depicts a block diagram of an example apparatus configured for managing data connections for a local GW deployment.
Figure 13:
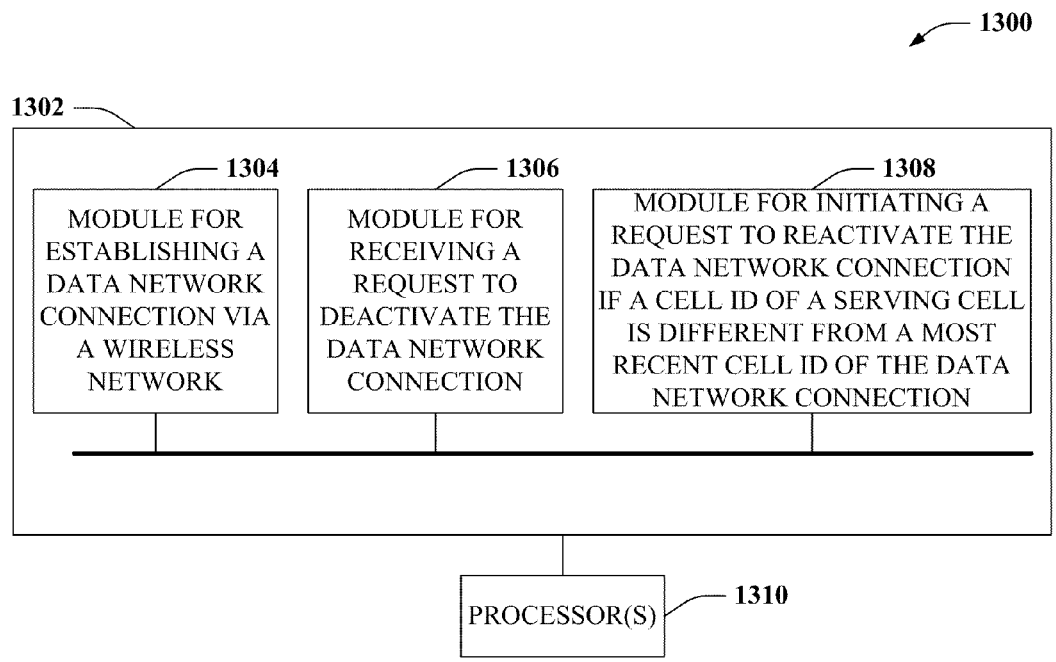
FIG. 13 illustrates a block diagram of a sample apparatus for employing data services in mobile communications in yet other aspects of the subject disclosure.

FIGS. 11, 12 and 13 illustrate respective example apparatuses 1100, 1200, 1300 for implementing improved acknowledgment and re-transmission protocols for wireless communication according to aspects of the subject disclosure. For instance, apparatuses 1100, 1200, 1300 can reside at least partially within a wireless communication network and/or within a wireless receiver such as a node, base station, access point, user terminal, personal computer coupled with a mobile interface card, or the like. It is to be appreciated that apparatuses 1100, 1200, 1300 are represented as including functional blocks, which can be functional blocks that represent functions implemented by a processor, software, or combination thereof (e.g., firmware).

Apparatus 1100 can comprise memory 1102 for storing modules or instructions configured to execute functions of apparatus 1100, including providing SIPTO for UEs operating in a mobile communication environment, and a data processor 1110 for executing modules implementing these functions. For instance, apparatus 1100 can comprise a module 1102 for receiving a request to establish a data network connection for a UE coupled with a mobile network. Moreover, apparatus 1100 can comprise a module 1104 for determining whether a local Internet Protocol (IP) traffic service is permitted for the UE based on a set of stored subscription information pertaining to the UE. In one instance, the local IP traffic service can pertain to a SIPTO service for accessing a data packet network via a local GW instead of a central GGSN or P-GW. In another instance, the local IP traffic service can pertain to initiating a LIPA communication between the UE and a local IP network, such as a WiFi network with one or more wireless IP routers, or a wide area IP network with a wide area network wireless router (e.g., wireless interoperability for microwave access [WiMAX]).

Further, apparatus 1100 can comprise a module 1106 for identifying a local data network gateway to establish the data network connection associated with a cell or an access point of the mobile network serving the UE, if the SIPTO is permitted. Module 1106 can perform a DNS query based on a FQDN comprised at least in part of an identifier of the UE or an identifier of the access point of the mobile network to retrieve the local data network gateway, in one instance, or can reference a data set that explicitly correlates local data network gateways with mobile network access points, utilizing an identifier of the access point of the mobile network to identify the local data network gateway. In various aspects of the subject disclosure, the data set can be stored in memory 1102, stored in a mobile network entity (e.g., a VLR, an HLR, or other suitable network entity), or stored at the access point of the mobile network, or the like.

Apparatus 1200 can comprise memory 1202 for storing modules or instructions configured to execute functions of apparatus 1200, including managing packet data connections for local packet network gateways, and a data processor 1208 for executing modules that implement these functions. Particularly, apparatus 1200 can comprise a module 1204 for identifying a packet connection at a local GW that provides data network service to a RAN. Additionally, apparatus 1200 can comprise a module 1206 for terminating the connection if a UE identified with the connection is actively coupled with a wireless node of the RAN that is outside of a service area of the local GW. Particularly, the service area is defined by at least one of: the set of wireless nodes for which a DNS query comprising an identifier of the UE or an identifier of the wireless node returns the local GW, or a data set that correlates wireless nodes of the RAN to the local GW.

Apparatus 1300 can comprise memory 1302 for storing modules or instructions configured to execute functions of apparatus 1300, including facilitating reactivation of data network connections established for a UE operating in a mobile networking environment, and a data processor 1310 for executing modules that implement these functions. Particularly, apparatus 1300 can comprise a module 1304 for establishing a data network connection via a wireless network. Further, apparatus 1300 can comprise a module 1306 for receiving a request to deactivate the data network connection. In addition to the foregoing, apparatus 1300 can comprise a module 1308 for initiating a request to reactivate the data network connection if a cell identifier of a current serving cell is different from a most recent cell identifier associated with the data network connection.

Figure 14:
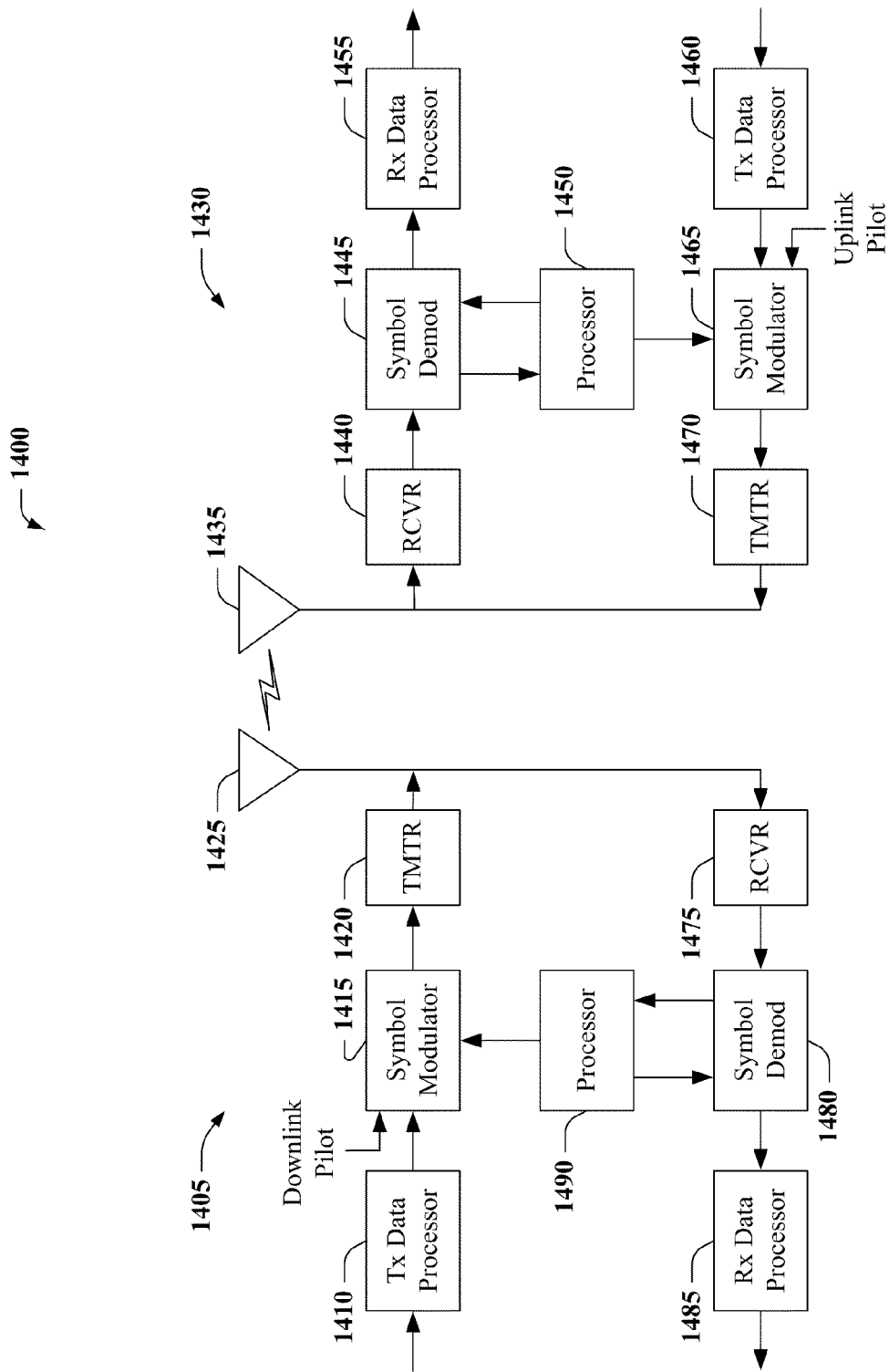
FIG. 14 illustrates a block diagram of an example wireless transmit-receive chain facilitating wireless communication according to some disclosed aspects.

FIG. 14 depicts a block diagram of an example system 1400 that can facilitate wireless communication according to some aspects disclosed herein. On a DL, at access point 1405, a transmit (TX) data processor 1410 receives, formats, codes, interleaves, and modulates (or symbol maps) traffic data and provides modulation symbols ("data symbols"). A symbol modulator 1415 receives and processes the data symbols and pilot symbols and provides a stream of symbols. A symbol modulator 1415 multiplexes data and pilot symbols and provides them to a transmitter unit (TMTR) 1420. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1420 receives and converts the stream of symbols into one or more analog signals and further conditions (e.g., amplifies, filters, and frequency upconverts) the analog signals to generate a DL signal suitable for transmission over the wireless channel. The DL signal is then transmitted through an antenna 1425 to the terminals. At terminal 1430, an antenna 1435 receives the DL signal and provides a received signal to a receiver unit (RCVR) 1440. Receiver unit 1440 conditions (e.g., filters, amplifies, and frequency downconverts) the received signal and digitizes the conditioned signal to obtain samples. A symbol demodulator 1445 demodulates and provides received pilot symbols to a processor 1450 for channel estimation. Symbol demodulator 1445 further receives a frequency response estimate for the DL from processor 1450, performs data demodulation on the received data symbols to obtain data symbol estimates (which are estimates of the transmitted data symbols), and provides the data symbol estimates to an RX data processor 1455, which demodulates (i.e., symbol demaps), deinterleaves, and decodes the data symbol estimates to recover the transmitted traffic data. The processing by symbol demodulator 1445 and RX data processor 1455 is complementary to the processing by symbol modulator 1415 and TX data processor 1410, respectively, at access point 1405.

On the UL, a TX data processor 1460 processes traffic data and provides data symbols. A symbol modulator 1465 receives and multiplexes the data symbols with pilot symbols, performs modulation, and provides a stream of symbols. A transmitter unit 1470 then receives and processes the stream of symbols to generate an UL signal, which is transmitted by the antenna 1435 to the access point 1405. Specifically, the UL signal can be in accordance with SC-FDMA requirements and can include frequency hopping mechanisms as described herein.

At access point 1405, the UL signal from terminal 1430 is received by the antenna 1425 and processed by a receiver unit 1475 to obtain samples. A symbol demodulator 1480 then processes the samples and provides received pilot symbols and data symbol estimates for the UL. An RX data processor 1485 processes the data symbol estimates to recover the traffic data transmitted by terminal 1430. A processor 1490 performs channel estimation for each active terminal transmitting on the UL. Multiple terminals can transmit pilot concurrently on the UL on their respective assigned sets of pilot sub-bands, where the pilot sub-band sets can be interlaced.

Processors 1490 and 1450 direct (e.g., control, coordinate, manage, etc.) operation at access point 1405 and terminal 1430, respectively. Respective processors 1490 and 1450 can be associated with memory units (not shown) that store program codes and data. Processors 1490 and 1450 can also perform computations to derive frequency and time-based impulse response estimates for the UL and DL, respectively.

For a multiple-access system (e.g., SC-FDMA, FDMA, OFDMA, CDMA, TDMA, etc.), multiple terminals can transmit concurrently on the UL. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal.

The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1490 and 1450.

Figure 15:
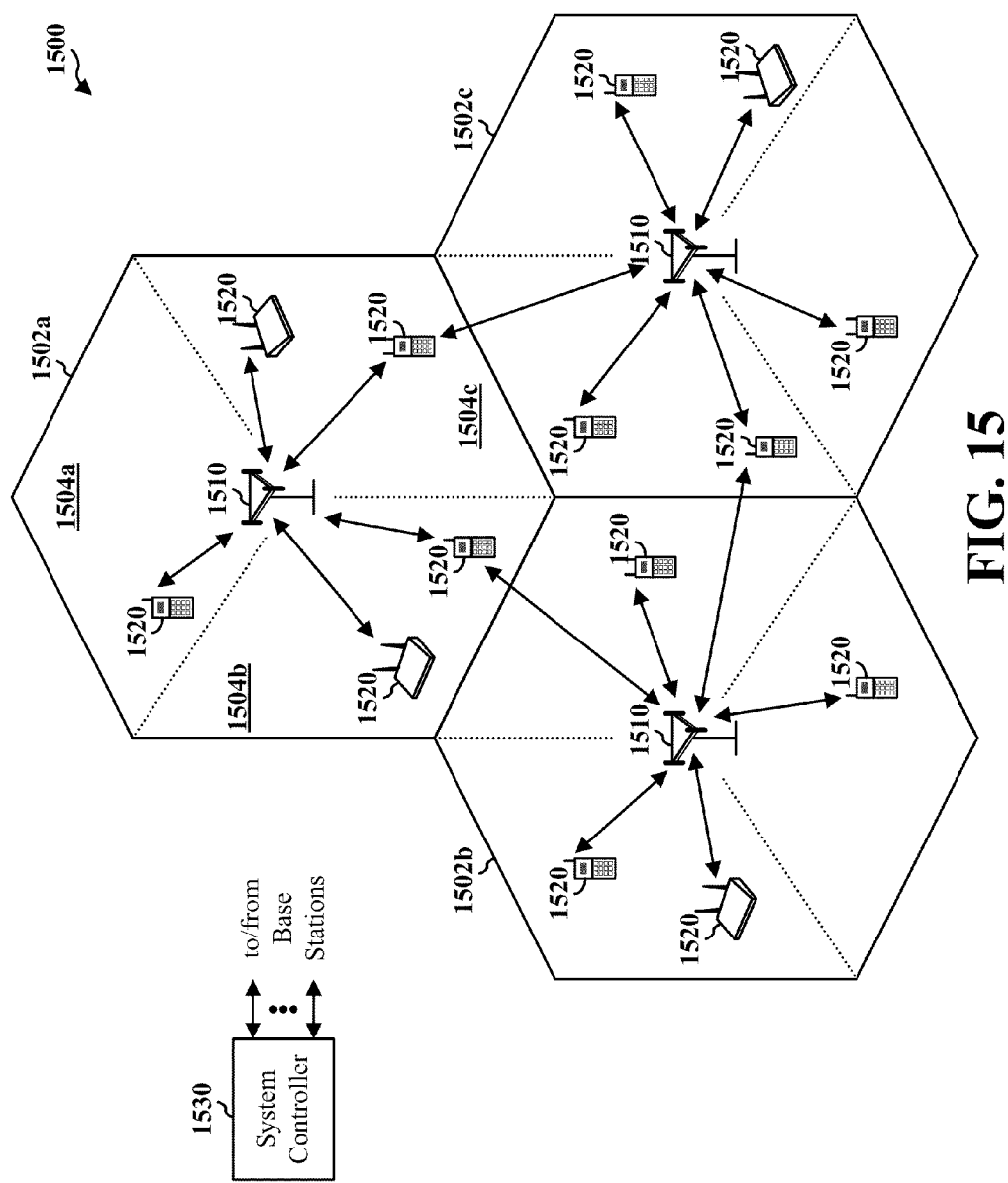
FIG. 15 illustrates a block diagram of an example wireless communication environment to facilitate various aspects of the subject disclosure.

FIG. 15 illustrates a wireless communication system 1500 with multiple base stations (BSs) 1510 (e.g., wireless access points, wireless communication apparatus) and multiple terminals 1520 (e.g., ATs), such as can be utilized in conjunction with one or more aspects. A BS 1510 is generally a fixed station that communicates with the terminals and can also be called an access point, a Node B, or some other terminology. Each BS 1510 provides communication coverage for a particular geographic area or coverage area, illustrated as three geographic areas in FIG. 15, labeled 1502a, 1502b, and 1502c. The term "cell" can refer to a BS or its coverage area depending on the context in which the term is used. To improve system capacity, a BS geographic area/coverage area can be partitioned into multiple smaller areas (e.g., three smaller areas, according to cell 1502a in FIG. 15), 1504a, 1504b, and 1504c. Each smaller area (1504a, 1504b, 1504c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1520 are typically dispersed throughout the system, and each terminal 1520 can be fixed or mobile. Terminals 1520 can also be called a mobile station, user equipment, a user device, wireless communication apparatus, an access terminal, a user terminal or some other terminology. A terminal 1520 can be a wireless device, a cellular phone, a personal digital assistant (PDA), a wireless modem card, and so on. Each terminal 1520 can communicate with zero, one, or multiple BSs 1510 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1530 couples to base stations 1510 and provides coordination and control for BSs 1510. For a distributed architecture, BSs 1510 can communicate with one another as needed (e.g., by way of a wired or wireless backhaul network communicatively coupling the BSs 1510). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 16:
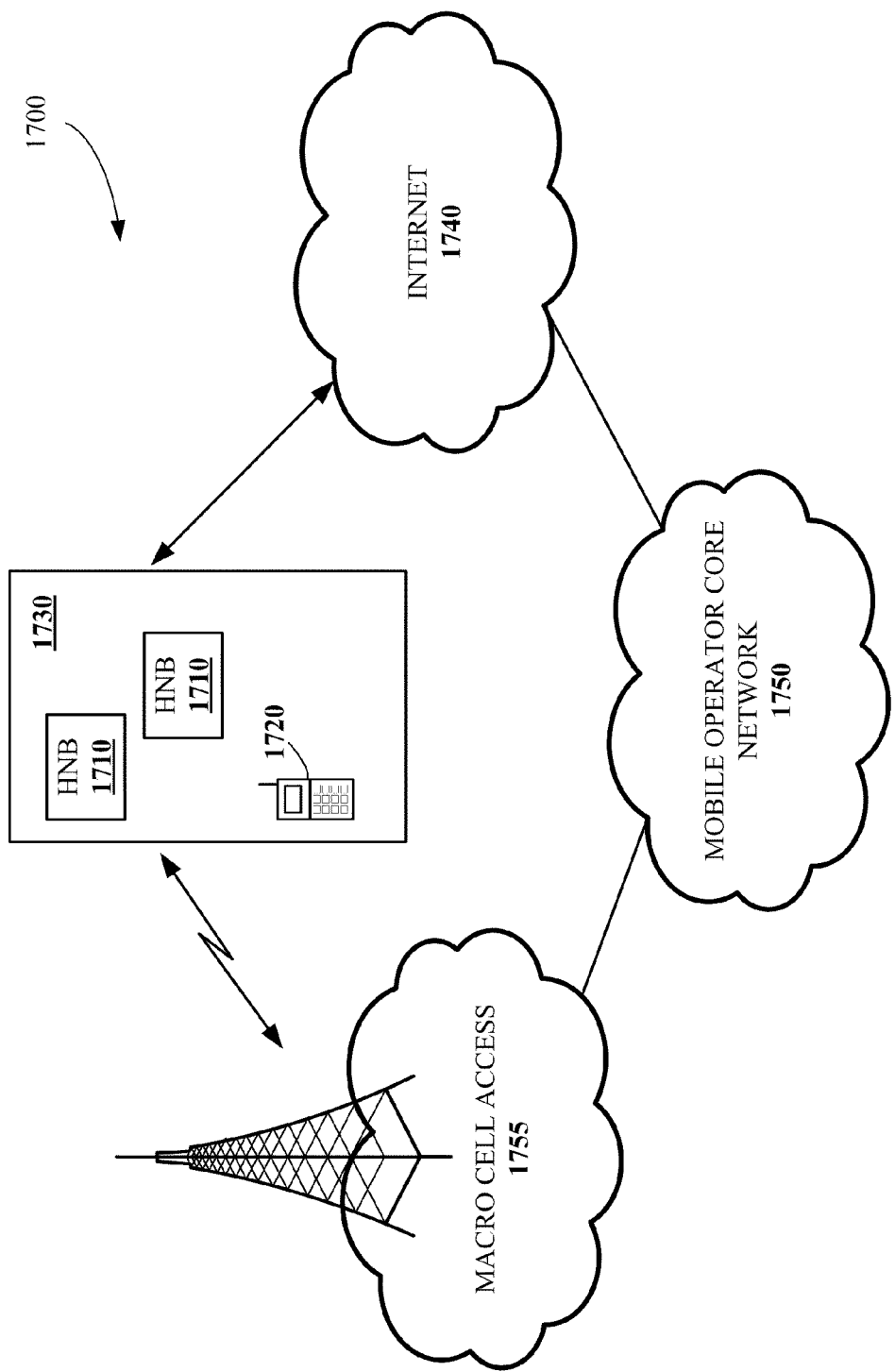
FIG. 16 depicts an exemplary communication system enabling deployment of access point base stations within a network environment.

FIG. 16 illustrates an exemplary communication system to enable deployment of access point base stations within a network environment. As shown in FIG. 16, the system 1600 includes multiple access point base stations or Home Node B units (HNBs) or Femto cells, such as, for example, HNBs 1610, each being installed in a corresponding small scale network environment, such as, for example, in one or more user residences 1630, and being configured to serve associated, as well as alien, user equipment (UE) 1620. Each HNB 1610 is further coupled to the Internet 1640 and a mobile operator core network 1650 via a DSL router (not shown) or, alternatively, a cable modem (not shown).

Although embodiments described herein use 3GPP terminology, it is to be understood that the embodiments may be applied to 3GPP (Rel99, Rel5, Rel6, Rel7) technology, as well as 3GPP2 (1×RTT, 1×EV-DO Rel0, RevA, RevB) technology and other known and related technologies. In such embodiments described herein, the owner of the HNB 1610 subscribes to mobile service, such as, for example, 3G mobile service, offered through the mobile operator core network 1650, and the UE 1620 is capable to operate both in macro cellular environment and in residential small scale network environment. Thus, the HNB 1610 is backward compatible with any existing UE 1620.

Furthermore, in addition to the mobile operator core network 1650, the UE 1620 can only be served by a predetermined number of HNBs 1610, namely the HNBs 1610 that reside within the user's residence 1630, and cannot be in a soft handover state with the mobile operator core network 1650. The UE 1620 can communicate with either the mobile operator core network 1650 via a macro cell access 1655 or with the HNBs 1610, but not both simultaneously. As long as the UE 1620 is authorized to communicate with the HNB 1610, within the user's residence it is desired that the UE 1620 communicate only with the associated HNBs 1610.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UE. A UE can also be called a system, a subscriber unit, a subscriber station, mobile station, mobile, mobile communication device, mobile device, remote station, remote terminal, AT, user agent (UA), a user device, or user terminal (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for wireless communication, comprising:
   receiving a request to establish a data network connection for a user equipment (a UE) coupled with a mobile network;
   determining whether a selected local Internet Protocol (IP) traffic service is permitted for the UE based on a set of stored subscription information pertaining to the UE;
   identifying a local data network gateway associated with a base station of the mobile network serving the UE for establishing the data network connection if the selected local Internet Protocol (IP) traffic service is permitted for the UE, wherein identifying the local data network gateway comprises referencing a mobile network cell serving the UE to obtain a data set that associates mobile network access points of the mobile network with local data network gateways, and wherein identifying the local data network gateway further comprises performing a domain name server query (a DNS query); and
   initiating deactivation of the data network connection upon expiration of a traffic timeout, or upon the UE moving out of a range of cells of the mobile network that are served by the local data network gateway.

2. The method of claim 1, wherein the local IP traffic service is a select IP traffic offload (SIPTO), and further comprising determining whether the SIPTO is permitted for an access point name (an APN) specified with the request.

3. The method of claim 2, wherein determining whether the SIPTO is permitted for the APN further comprises identifying whether the APN meets a QoS requirement of traffic associated with the request.

4. The method of claim 2, wherein the subscription information is updated based on radio bearer capabilities of the APN, subscription status of the UE, a tariff rate associated with the local data network gateway, or a combination thereof.

5. The method of claim 2, wherein determining whether the SIPTO is permitted for the APN comprises determining whether charging requirements associated with the request are supported by the local data network gateway.

6. The method of claim 1, wherein determining whether the local IP traffic service is permitted for the UE comprises determining whether content tracking requirements associated with the UE are supported by the local data network gateway.

7. The method of claim 1, further comprising forming a fully qualified domain name (a FQDN) comprising an indicator that enables a domain name server to:
   retrieve a proximate local data network gateway that is geographically or topologically closest to a mobile network cell serving the UE; and
   return the proximate local data network gateway in response to the DNS query.

8. The method of claim 7, wherein the indicator is based on an identifier of the UE and specifies whether a subscription of the UE allows the local IP traffic service, or is based on an identifier of the cell or the access point of the mobile network or a combination thereof.

9. An apparatus for wireless communication, comprising:
   a receiving module configured to identify a request for a connection to an IP network and that retrieves a set of subscription information for a user equipment (a UE) initiating the request;
   a parsing module configured to analyze the subscription information and determines whether the UE is permitted to utilize local packet gateway (local GW) service;
   a reference module configured to identify a local GW to establish the connection to the IP network, and that is associated with a base station providing mobile network service to the UE, wherein the local GW is identified by referencing a mobile network cell serving the UE to obtain a data set that associates mobile network access points of the mobile network with local data network gateways, and wherein the reference module is further configured to perform a domain name server query (a DNS query) to identify the local GW; and
   a termination module configured to initiate deactivation of the connection upon expiration of a traffic timeout, or upon the UE moving outside a service range of the local GW.

10. The apparatus of claim 9, wherein the reference module is further configured to create a fully qualified domain name (a FQDN) that enables a domain name server to return the local GW that is geographically or topologically closest to the base station.

11. The apparatus of claim 10, wherein the FQDN is based at least in part on an identifier of the UE or an identifier of the base station.

12. The apparatus of claim 9, wherein the reference module is further configured to obtain a specified packet gateway (P-GW) identifier associated with the base station from memory or from the base station.

13. The apparatus of claim 9, wherein the parsing module is further configured to extract a set of local GWs that the UE is permitted to access from the subscription information.

14. The apparatus of claim 13, further comprising an access module configured to compare an identifier of the local GW obtained from the reference module to the set of local GWs obtained from the parsing module to determine whether the UE is permitted to utilize local GW service in response to the request.

15. The apparatus of claim 9, wherein a set of IP network access point names (APNs) included in the subscription information are associated with respective permitted and unpermitted (permitted/unpermitted) flags, and further wherein a status of a permitted/unpermitted flag is updated based on at least one of:
subscription status of the UE;
government tracking requirements instituted for the UE;
radio bearer capabilities of an associated local gateway (GW); or
a tariff charged by an operator of the associated local GW.

16. The apparatus of claim 9, wherein the parsing module is configured to determine that the UE is permitted to utilize local gateway (GW) service if an access point name (APN) included in the request is associated with a permitted and unpermitted (permitted/unpermitted) flag set to permitted in the subscription information.

17. The apparatus of claim 9, wherein the service range of the local GW is determined from at least one of:
a list of bases stations, tracking areas, routing areas, location areas or radio network controllers that are associated with the local GW; or
a DNS query that returns an identifier of the local GW.

18. An apparatus for wireless communication, comprising:
means for receiving a request to establish a data network connection for a user equipment (a UE) coupled with a mobile network;
means for determining whether a local Internet Protocol (IP) traffic service is permitted for the UE based on a set of stored subscription information pertaining to the UE;
means for identifying a local data network gateway associated with a base station of the mobile network serving the UE to establish the data network connection if the local IP traffic service is permitted for the UE, wherein the means for identifying the local data network gateway comprises means for referencing a mobile network cell serving the UE to obtain a data set that associates mobile network access points of the mobile network with local data network gateways, and wherein the means for identifying the local data network gateway further comprise means for performing a domain name server query (a DNS query); and
means for initiating deactivation of the data network connection upon expiration of a traffic timeout, or upon the UE moving out of a range of cells of the mobile network that are served by the local data network gateway.

19. An apparatus configured for wireless communication, comprising at least one processor, wherein the at least one processor comprises:
a first module configured to receive a request to establish a data network connection for a user equipment (a UE) coupled with a mobile network;
a second module configured to determine whether a local Internet Protocol (IP) traffic service is permitted for the UE based on a set of stored subscription information pertaining to the UE;
a third module configured to identify a local data network gateway to establish the data network connection that is associated with a cell or an access point of the mobile network serving the UE, if the local IP traffic service is permitted, wherein the local data network gateway is identified by referencing a mobile network cell serving the UE to obtain a data set that associates mobile network access points of the mobile network with local data network gateways, and wherein the local data network gateway is further identified by performing a domain name server query (a DNS query); and
a fourth module configured to initiate deactivation of the data network connection upon expiration of a traffic timeout, or upon the UE moving out of a range of cells of the mobile network that are served by the local data network gateway.

20. A non-transitory computer-readable medium, comprising:
a first set of code for causing a computer to receive a request to establish a data network connection for a user equipment (a UE) coupled with a mobile network;
a second set of code for causing the computer to determine whether a local Internet Protocol (IP) traffic service is permitted for the UE based on a set of stored subscription information pertaining to the UE;
a third set of code for causing the computer to identify a local data network gateway to establish the data network connection that is associated with a cell or an access point of the mobile network serving the UE, if the local (IP) traffic service is permitted, wherein the local data network gateway is identified by referencing a mobile network cell serving the UE to obtain a data set that associates mobile network access points of the mobile network with local data network gateways, and wherein the local data network gateway is further identified by performing a domain name server query (a DNS query); and
a fourth set of code for causing the computer to initiate deactivation of the data network connection upon expiration of a traffic timeout, or upon the UE moving out of a range of cells of the mobile network that are served by the local data network gateway.

21. A method of wireless communication, comprising:
identifying a data network connection established for a user equipment (a UE) that receives wireless service from a mobile network base station;
referencing a first identifier associated with a data network access point that facilitates the data network connection; and
initiating deactivation of the data network connection if the first identifier does not match a second identifier of a data network access point associated with the mobile network base station, wherein the first identifier and the second identifier comprise respective first and second Internet Protocol (IP) addresses and the initiating deactivation is conditioned on the first and second IP addresses being non-identical, and wherein matching the first identifier and the second identifier further comprises referencing a list of data network access point identifiers associated with the mobile network base station and determining whether the first identifier is included in the list of data network access point identifiers.

22. The method of claim 21, further comprising:
performing a domain name server query (a DNS query) for the mobile network base station or for the UE;
retrieving an access point identifier in response to the DNS query; and
employing the access point identifier as the second identifier.

23. The method of claim 22, further comprising forming a fully qualified domain name (a FQDN) that facilitates identifying a local packet gateway that is geographically or topologically nearest to the mobile network base station, wherein the FQDN is based on at least one of:
an identifier of the UE; or
an identifier of the mobile network base station.

24. The method of claim 21, wherein:
the list of data network access point identifiers comprises respective mobile network tracking areas, mobile network location areas, mobile network routing areas, base station identifiers, or radio network controller identifiers, or a combination thereof, for one or more data network access points associated with the mobile network base station.

25. The method of claim 21, further comprising initiating a deactivation request and sending the deactivation request to the UE if the first identifier does not match the second identifier.

26. The method of claim 21, further comprising initiating a deactivation request and sending the deactivation request to a network entity that manages the data network connection if the first identifier does not match the second identifier.

27. The method of claim 21, further comprising determining that the UE is conducting or has conducted a handover to the mobile network base station, and initiating deactivation of the data network connection as a result of the handover.

28. The method of claim 21, further comprising forwarding a reactivation command to the UE that causes the UE to request reactivation of the data network connection at the data network access point associated with the mobile base station.

29. The method of claim 28, further comprising forwarding the reactivation command as a result of:
rebooting of a local data network gateway supporting the data network connection;
load balancing of the local data network gateway with associated local data network gateways; or
the UE traveling outside of a coverage area of the local data network gateway.

30. A method of wireless communication, comprising:
establishing a data network connection via a wireless network;
receiving a request to deactivate the data network connection;
receiving at a user equipment (UE) a reactivation command for the data network connection, wherein the reactivation command is received in response to a premature termination of the data network connection;
comparing at the UE a cell identifier of a current serving cell with a most recent cell identifier associated with the data network connection as a result of receiving the reactivation command; and
initiating at the UE a request to reactivate the data network connection when the cell identifier of the current serving cell is different from the most recent cell identifier associated with the data network connection.

31. The method of claim 30, further comprising performing a handover to a neighboring cell, wherein receiving the request to deactivate results at least in part from performing the handover.

32. The method of claim 30, wherein initiating the request further comprises determining that the current serving cell is outside of a service range of a local data network gateway supporting the data network connection.

33. An apparatus for wireless communication, comprising:
a connection module configured to receive a command to deactivate a packet network connection that is established at a selected Internet Protocol traffic offload gateway (a SIPTO gateway) and to receive at a user equipment (UE) an explicit reactivation command, wherein the explicit reactivation command is received in response to a premature termination of the packet network connection; and
a continuation module configured to initiate at the UE a request to reactivate the packet network connection as a result of receiving the explicit reactivation command when a cell identifier of a current serving cell is different from a most recent cell identifier associated with the packet network connection.

34. The apparatus of claim 33, further comprising a mobility module configured to detect a handover or an active link from idle state to the current serving cell, wherein receiving the command to deactivate results at least in part from the handover or the active link from idle state.

35. The apparatus of claim 33, wherein the continuation module is further configured to determine that the current serving cell is outside of a service range of the SIPTO gateway.

36. An apparatus for wireless communication, comprising:
means for establishing a data network connection via a wireless network;
means for receiving a request to deactivate the data network connection;
means for receiving at a user equipment (UE) a reactivation command for the data network connection, wherein the reactivation command is received in response to a premature termination of the data network connection;
means for comparing at the UE a cell identifier of a current serving cell with a most recent cell identifier associated with the data network connection as a result of receiving the reactivation command; and
means for initiating at the UE a request to reactivate the data network connection when the cell identifier of the current serving cell is different from the most recent cell identifier associated with the data network connection.

37. An apparatus configured for wireless communication, comprising at least one processor, wherein the at least one processor comprises:
a first module configured to establish a data network connection via a wireless network;

a second module configured to receive a request to deactivate the data network connection;

a third module configured to receive at a user equipment (UE) a reactivation command for the data network connection, wherein the reactivation command is received in response to a premature termination of the data network connection;

a fourth module configured to compare at the UE a cell identifier of a current serving cell with a most recent cell identifier associated with the data network connection as a result of receiving the reactivation command; and a fifth module configured to initiate at the UE a request to reactivate the data network connection when the cell identifier of the current serving cell is different from the most recent cell identifier associated with the data network connection.

38. A non-transitory computer-readable medium, comprising:

a first set of code that causes a computer to establish a data network connection via a wireless network;

a second set of code that causes the computer to decode a request to deactivate the data network connection received from an entity of the wireless network;

a third set of code that causes the computer to receive at a user equipment (UE) a reactivation command for the data network connection, wherein the reactivation command is received in response to a premature termination of the data network connection;

a fourth set of code that causes the computer to compare at the UE a cell identifier of a current serving cell with a most recent cell identifier associated with the data network connection as a result of receiving the reactivation command; and a fifth set of code that causes the computer to initiate a request to reactivate the data network connection when the cell identifier of the current serving cell is different from the most recent cell identifier associated with the data network connection.

\* \* \* \* \*